(12) United States Patent
Kawamae et al.

(10) Patent No.: US 10,971,953 B2
(45) Date of Patent: Apr. 6, 2021

(54) CONTACTLESS POWER RECEIVING DEVICE, CONTACTLESS POWER TRANSFER DEVICE, AND CONTACTLESS POWER TRANSFER AND RECEIVING DEVICE

(71) Applicant: MAXELL, LTD., Kyoto (JP)

(72) Inventors: Osamu Kawamae, Kyoto (JP); Katsuei Ichikawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 79 days.

(21) Appl. No.: 16/328,120

(22) PCT Filed: Aug. 26, 2016

(86) PCT No.: PCT/JP2016/075060
§ 371 (c)(1),
(2) Date: Feb. 25, 2019

(87) PCT Pub. No.: WO2018/037566
PCT Pub. Date: Mar. 1, 2018

(65) Prior Publication Data
US 2019/0190319 A1    Jun. 20, 2019

(51) Int. Cl.
*H02J 50/12* (2016.01)
*H01F 38/14* (2006.01)
(Continued)

(52) U.S. Cl.
CPC ............ *H02J 50/12* (2016.02); *B60L 53/12* (2019.02); *H01F 38/14* (2013.01); *H02J 5/005* (2013.01);
(Continued)

(58) Field of Classification Search
CPC .. H02J 50/12; H02J 5/005; H02J 50/80; H02J 50/10; H02J 7/025; B60L 53/12;
(Continued)

(56) References Cited

U.S. PATENT DOCUMENTS 6,750,560 B1 * 6/2004 Nishimoto ............... H02J 50/10
307/1
8,772,975 B2 * 7/2014 Mayo .................... H03F 3/2176
307/104
(Continued)

FOREIGN PATENT DOCUMENTS

JP    2005-137040 A      5/2005
JP    2005137040 A  *   5/2005
(Continued)

OTHER PUBLICATIONS

International Search Report issued in corresponding International Patent Application No. PCT/JP2016/075060, dated Nov. 1, 2016, with English Translation.

*Primary Examiner* — Jared Fureman
*Assistant Examiner* — Michael J Warmflash
(74) *Attorney, Agent, or Firm* — McDermott Will & Emery LLP

(57) ABSTRACT

A contactless power receiving device includes a power receiving coil receiving power from a contactless power transfer device, a rectifier circuit rectifying the power to form a rectified output on a high potential side and a rectified output on a low potential side, a smoothing circuit receiving the rectified output on the high potential side and the rectified output on the low potential side, and a switching power supply converting a DC voltage from the smoothing circuit to a first voltage. The smoothing circuit includes a first inductor transmitting the rectified output on the high potential side, a second inductor transmitting the rectified output on the low potential side, and a smoothing capacitance element to which the rectified output on the high potential side and the rectified output on the low potential side are supplied, and the rectified output on the low potential side is connected to a ground potential.

13 Claims, 18 Drawing Sheets

(51) Int. Cl.
- *H02J 7/02* (2016.01)
- *H02M 7/06* (2006.01)
- *H02M 7/46* (2006.01)
- *H02J 5/00* (2016.01)
- *B60L 53/12* (2019.01)
- *H02J 50/80* (2016.01)
- *H02J 50/10* (2016.01)
- *H02M 7/48* (2007.01)

(52) U.S. Cl.
CPC .............. *H02J 7/025* (2013.01); *H02J 50/10* (2016.02); *H02J 50/80* (2016.02); *H02M 7/06* (2013.01); *H02M 7/46* (2013.01); *H02M 2007/4815* (2013.01)

(58) Field of Classification Search
CPC .... B60L 2270/147; H01F 38/14; H02M 7/06; H02M 7/46; H02M 2007/4815
See application file for complete search history.

(56) References Cited

U.S. PATENT DOCUMENTS

| | | | | |
|---|---|---|---|---|
| 9,531,441 | B2* | 12/2016 | Bae | H01F 38/14 |
| 9,583,964 | B2* | 2/2017 | Murayama | H02J 50/60 |
| 10,158,254 | B2* | 12/2018 | Akuzawa | H02J 50/12 |
| 10,276,899 | B2* | 4/2019 | Boys | B60L 53/124 |
| 2011/0133570 | A1* | 6/2011 | Mayo | H03F 3/2176 |
| | | | | 307/104 |
| 2012/0119697 | A1* | 5/2012 | Boys | H01Q 7/08 |
| | | | | 320/108 |
| 2013/0076153 | A1* | 3/2013 | Murayama | H02J 7/00045 |
| | | | | 307/104 |
| 2013/0077360 | A1* | 3/2013 | Low | H02J 50/12 |
| | | | | 363/47 |
| 2013/0214611 | A1* | 8/2013 | Bae | H04B 5/0037 |
| | | | | 307/104 |
| 2014/0028093 | A1* | 1/2014 | Aikawa | H02J 7/025 |
| | | | | 307/11 |
| 2017/0155283 | A1* | 6/2017 | Akuzawa | H02J 50/12 |

FOREIGN PATENT DOCUMENTS

| | | | |
|---|---|---|---|
| JP | 2012-527214 A | 11/2012 | |
| JP | 2013-070580 A | 4/2013 | |
| JP | 2013-513356 A | 4/2013 | |
| JP | 2013-172641 A | 9/2013 | |
| JP | 2013-223271 A | 10/2013 | |
| JP | 2014-072966 A | 4/2014 | |
| JP | 2014-530592 A | 11/2014 | |
| JP | 2015-220816 A | 12/2015 | |
| JP | 2015220816 A * | 12/2015 | |
| JP | 2016-063726 A | 4/2016 | |
| JP | 2016-140158 A | 8/2016 | |
| WO | 2015/186580 A1 | 12/2015 | |
| WO | 2016/035141 A1 | 3/2016 | |
| WO | WO-2016035141 A1 * | 3/2016 | ............ H02J 50/12 |

\* cited by examiner (A)

(B)

(C)
$$Q = \sqrt{\frac{R1/2}{R2/2} - 1} \quad \cdots \text{ EXPRESSION (1)}$$

$$L = \frac{Q \cdot R2/2}{2\pi f} \quad \cdots \text{ EXPRESSION (2)}$$

$$C = \frac{Q}{2\pi f \cdot R1} \quad \cdots \text{ EXPRESSION (3)}$$

(A)

(B)

(A)

(B)

CONTACTLESS POWER RECEIVING DEVICE, CONTACTLESS POWER TRANSFER DEVICE, AND CONTACTLESS POWER TRANSFER AND RECEIVING DEVICE

CROSS REFERENCE

This application is the U.S. National Phase under 35 U.S.C. § 371 of International Application No. PCT/JP2016/075060, filed on Aug. 26, 2016, the entire contents are hereby incorporated by reference.

TECHNICAL FIELD

The present invention relates to a wireless power transfer technology and relates to, for example, a contactless power receiving device, a contactless power transfer device, and a contactless power transfer and receiving device relative to a contactless power transfer technology for contactlessly charging batteries of portable terminals such as mobile devices and electric vehicles.

BACKGROUND ART

In recent years, portable terminals such as mobile devices have been reduced in size and thickness. When the reduction in size and thickness has advanced, the connection of a charging connector at the time of charging of a built-in battery becomes troublesome. Therefore, the demand for charging by the wireless power transfer technology has been increasing. Also, in the case of the wired charging for a built-in battery of an electric vehicle, water may enter the charging connector at the time of rain and the contact point may be deteriorated, and thus the charging by the wireless power transfer technology has been desired.

As the wireless power transfer technology, a system using a radio wave such as a microwave and an inductive coupling system using magnetic field coupling have been studied.

The wireless power transfer technology using a microwave is excellent in transmission distance because it is possible to relatively increase the power transmission distance. However, the wireless power transfer technology using a microwave is poor in transmission efficiency, and is hardly put into practical use. Meanwhile, the inductive coupling system has a transmission distance as short as about several cm to 10 and several cm, but the transmission efficiency of the coil used for power transfer and reception as high as about 90% can be obtained. For these reasons, it is considered that transmission by inductive coupling system will be the mainstream for the wireless power transfer technology.

The inductive coupling system is described in, for example, Patent Document 1 and Patent Document 2.

RELATED ART DOCUMENTS

Patent Documents

Patent Document 1: International Publication No. WO2016/035141
Patent Document 2: Japanese Patent Application Laid-Open Publication No. 2013-513356

SUMMARY OF THE INVENTION

Problems TO BE Solved BY THE Invention

A contactless power transfer and receiving device that adopts the inductive coupling system is composed of a power transfer coil, a power receiving coil, a power transfer amplifier which amplifies a power transfer frequency, a rectifier circuit which converts a received power into DC power, and a DC-DC (direct current-direct current) converter which outputs a DC voltage having a preset value. As described above, the transmission efficiency of the coil, that is, the transmission efficiency between the power transfer coil and the power receiving coil can be as high as about 90%, but the overall efficiency of the contactless power transfer and receiving device is affected not only by the transmission efficiency of the coil but also the efficiency of other constituent parts. For example, when each of the transmission efficiency of the coil, the efficiency of the power transfer amplifier, the efficiency of the rectifier circuit, and the efficiency of the DC-DC converter is 90%, the overall efficiency is reduced to about 66% (0.9×0.9×0.9×0.9≈66). For this reason, it is necessary to suppress the reduction of the efficiency as much as possible by increasing the efficiency of each constituent part and achieving the impedance matching at the time of connection between the constituent parts.

Patent Document 1 discloses a technology for achieving the impedance matching at the time of connection between the constituent parts. Here, the technology disclosed in Patent Document 1 will be described with reference to FIG. 1 of Patent Document 1. In the following description, characters in parentheses ( ) indicate characters assigned in FIG. 1 of Patent Document 1. Note that, in Patent Document 1, the contactless power transfer device is described as a resonant power transfer device and the contactless power receiving device is described as a resonant power receiving device. In addition, the power transfer coil is described as a resonant power transfer antenna and the power receiving coil is described as a resonant power receiving antenna. For the unification of terms, the contactless power transfer device, the contactless power receiving device, the power transfer coil, and the power receiving coil are used in the description in this specification.

In Patent Document 1, the contactless power transfer and receiving device includes a contactless power transfer device (1) and a contactless power receiving device (2). Here, the contactless power transfer device (1) includes a resonant power supply (11), a matching circuit (12), and a power transfer coil (13). Also, the contactless power receiving device (2) includes a power receiving coil (21), a rectifier circuit (22), and a receiving circuit (23).

The power transferred from the resonant power supply (11) of the contactless power transfer device (1) is transferred from the power transfer coil (13) through the matching circuit (12). The transferred power is received by the power receiving coil (21) of the contactless power receiving device (2) and is rectified by the rectifier circuit (22), and then is supplied to the receiving circuit (23). At this time, the matching circuit (12) matches the impedance between the resonant power supply (11) and the power transfer coil (13). In addition, the matching with the power receiving coil (21) is achieved by the rectifier circuit (22) in the contactless power receiving device (2).

In a general contactless power receiving device, a battery or a charging circuit of a battery serves as a load, and the battery is charged by the output of the contactless power receiving device. For example, since the battery is charged by supplying a constant DC voltage, the contactless power receiving device includes a DC-DC converter or a switching power supply such as a chopper circuit and is configured to output the constant DC voltage. Though descriptions will be given later with using a DC-DC converter as an example, the switching power supply has characteristics that its input equivalent resistance changes depending on the amount of power to be transferred and the state of the load. In Patent Document 1, such characteristics of the DC-DC converter are not shown, and matching with the characteristics of the DC-DC converter is not taken into account.

A DC-DC converter operates so that a power consumption is constant when a load resistance thereof is constant. Therefore, for example, in a case in which the power transferred from the contactless power transfer device increases and the power received in the contactless power receiving device increases, when the input voltage of the DC-DC converter rises, the input current of the DC-DC converter decreases, and the DC-DC converter operates so that a constant power is received. In this case, since the input current of the DC-DC converter decreases, the input equivalent resistance of the DC-DC converter increases.

Since the DC-DC converter has characteristics that the output power is constant, it is sufficient that the product of the input voltage and the input current is constant and substantially equal to the power consumption of the DC-DC converter. Therefore, even if the output power is constant, there are a plurality of combinations of the input voltage value and the input current value, and the input voltage and the input current converge to the input voltage value and the input current value corresponding to any of the plurality of combinations. For example, in a case of a step-down type DC-DC converter, it operates as a DC-DC converter if the input voltage is slightly higher than the output voltage. Therefore, as the convergence conditions, there are a plurality of combinations of the input voltage slightly higher than the output voltage and the input current.

Depending on the matching state between the DC-DC converter and the rectifier circuit and the matching state between the power transfer coil and the power receiving coil, the input voltage sometimes converges to the input voltage value exceeding the breakdown voltage of a device constituting the rectifier circuit among the plurality of combinations. This leads to the destruction of the device.

Further, among the plurality of combinations, the input voltage sometimes converges to the input voltage value which causes the DC-DC converter to operate in a state of low conversion efficiency. For example, in a case of a step-down type DC-DC converter, the conversion efficiency is highest when the input voltage is slightly higher than the output voltage, and the conversion efficiency tends to be lower as the input voltage becomes higher. Therefore, it is desirable that the input voltage of the DC-DC converter converges to the value slightly higher than the output voltage from the viewpoint of efficiency. However, depending on the matching state between the DC-DC converter and the rectifier circuit and the matching state between the power transfer coil and the power receiving coil, the input voltage sometimes converges to the value higher than the output voltage. In this case, the DC-DC converter operates in the state of low conversion efficiency.

Further, depending on the matching state, the input voltage sometimes converges to the input voltage value that is lower than the output voltage of the DC-DC converter and is incapable of causing the DC-DC converter to operate among the plurality of combinations, so that the phenomenon in which the normal operation is impossible occurs. Namely, depending on the matching state, the DC-DC converter cannot operate stably and efficiently in some cases.

Also, as the configuration for improving the efficiency of the respective constituent parts, for example, it is conceivable to improve the efficiency by using a switching type amplifier for the power transfer amplifier. In this case, there is a fear that switching noise generated in the power transfer amplifier is radiated to the outside via the power transfer coil and interferes with other radio equipment and the like. For example, Patent Document 2 shows the configuration for reducing the output noise of the power transfer amplifier in a differential operation, but the reduction of the ripple voltage due to the ripple generated by superimposing the received signal components on the rectified voltage is not taken into account at all.

An object of the present invention is to provide a contactless power transfer and receiving device capable of operating stably.

Also, another object of the present invention is to provide a contactless power transfer and receiving device capable of reducing noise.

The above and other objects and novel features of the present invention will be apparent from the descriptions of the specification and the accompanying drawings.

Means for Solving the Problems

The following is a brief description of an outline of the typical invention disclosed in the present application.

Namely, a contactless power receiving device comprises: a power receiving coil configured to receive power from a contactless power transfer device; a rectifier circuit configured to rectify the power received by the power receiving coil to form a rectified output on a high potential side and a rectified output on a low potential side; a smoothing circuit configured to smooth the rectified output on the high potential side and the rectified output on the low potential side, thereby forming a DC voltage; and a switching power supply configured to convert the DC voltage from the smoothing circuit to a first voltage. Here, the smoothing circuit includes a first inductor configured to transmit the rectified output on the high potential side, a second inductor configured to transmit the rectified output on the low potential side, and a first smoothing capacitance element to which the transmitted rectified output on the high potential side and the transmitted rectified output on the low potential side are supplied, and the transmitted rectified output on the low potential side is connected to a ground potential.

Since a high-frequency signal in the rectified output on a high potential side is transmitted to a ground potential through the first smoothing capacitance element and a high-frequency signal in the rectified output on a low potential side is also transmitted to a ground potential, it is possible to suppress the generation of noise from the contactless power receiving device.

Also, since the rectified output having a frequency in accordance with the frequency of the received power is supplied to the first inductor and the second inductor, the impedance (resistance component) of the first inductor and the second inductor becomes higher. Accordingly, it is possible to narrow the range in which the input voltage of the switching power supply converges, and it is possible to provide a contactless power receiving device capable of operating stably.

Effects of the Invention

The effects obtained by typical invention disclosed in the present application will be briefly described below.

It is possible to provide a contactless power transfer and receiving device capable of operating stably. Also, it is possible to provide a contactless power transfer and receiving device capable of reducing noise.

BRIEF DESCRIPTIONS OF THE DRAWINGS

Figure 11:
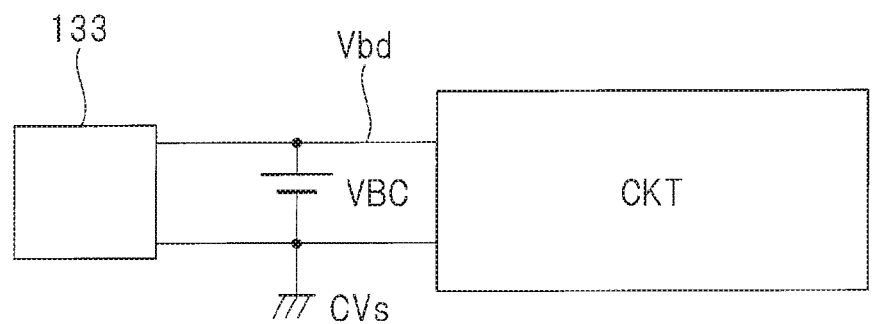
Figure 12:
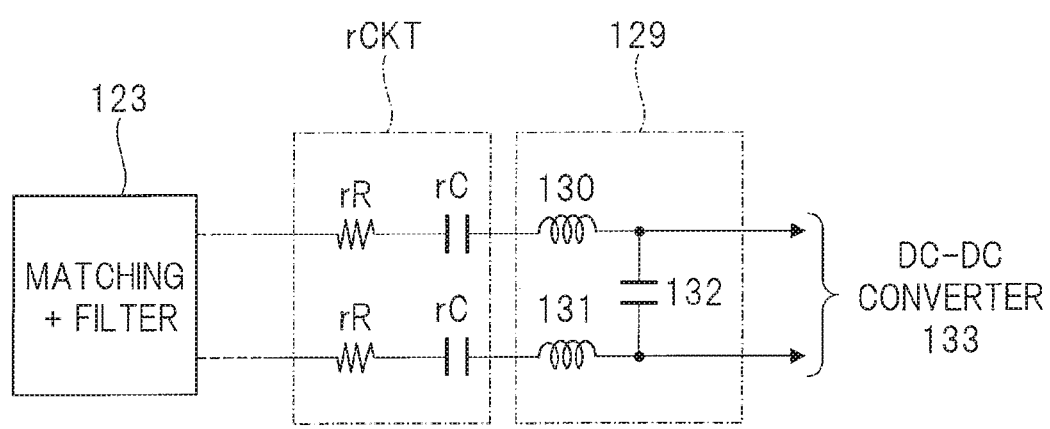
Figure 14:
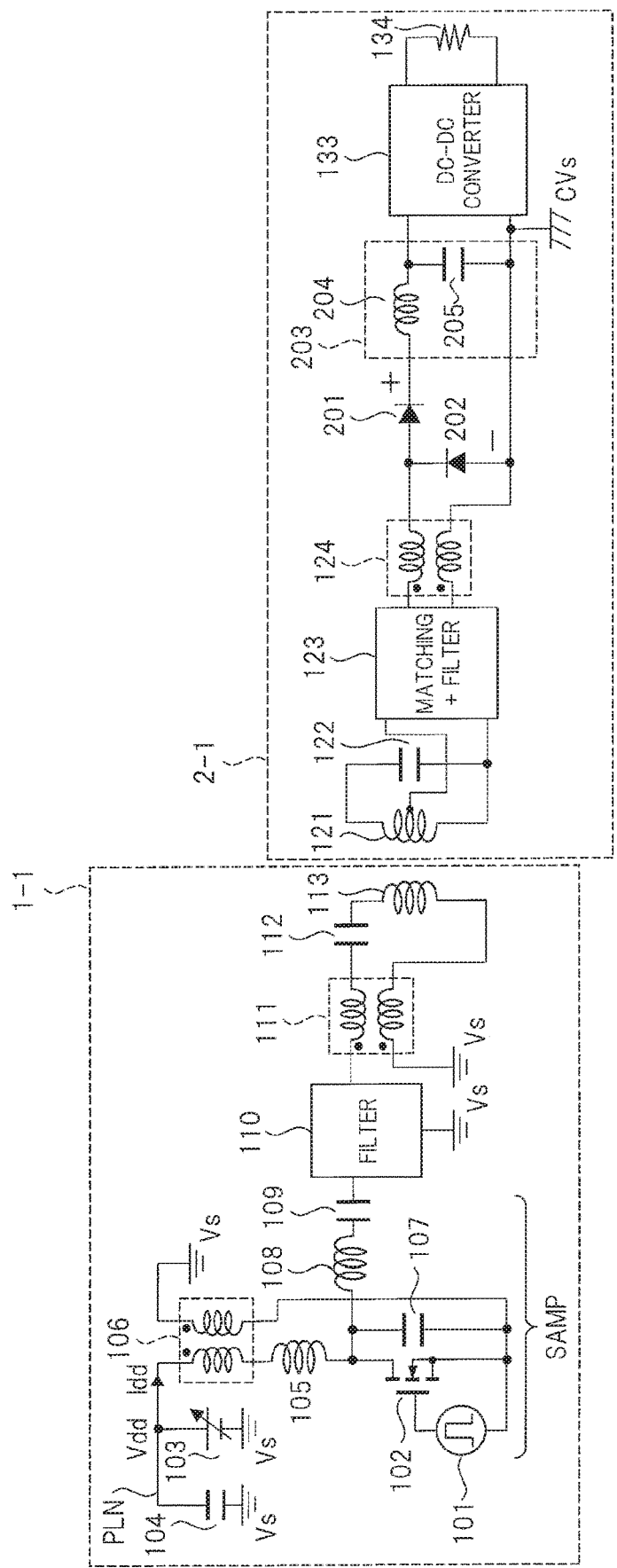
Figure 15:
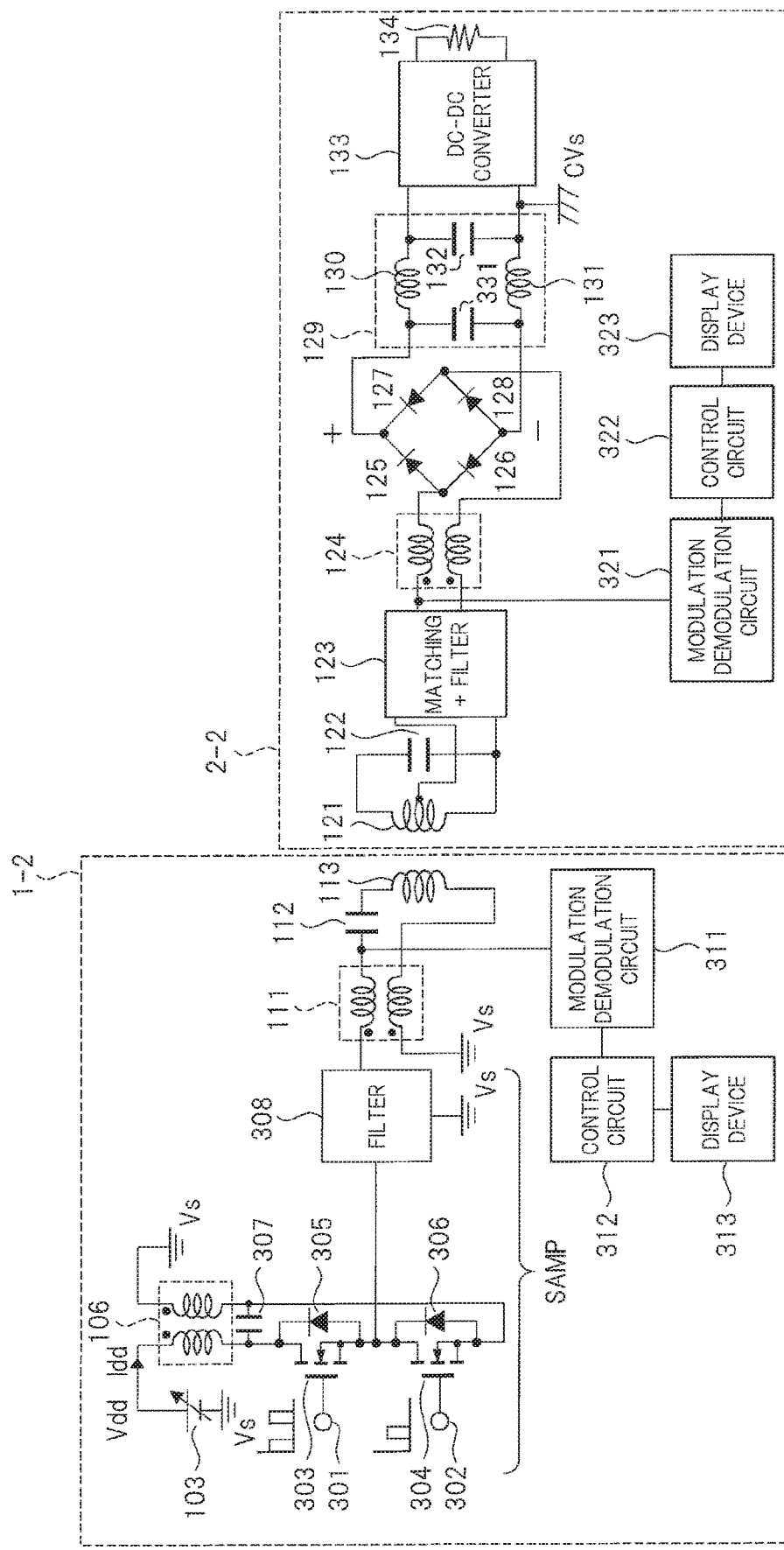
Figure 16:
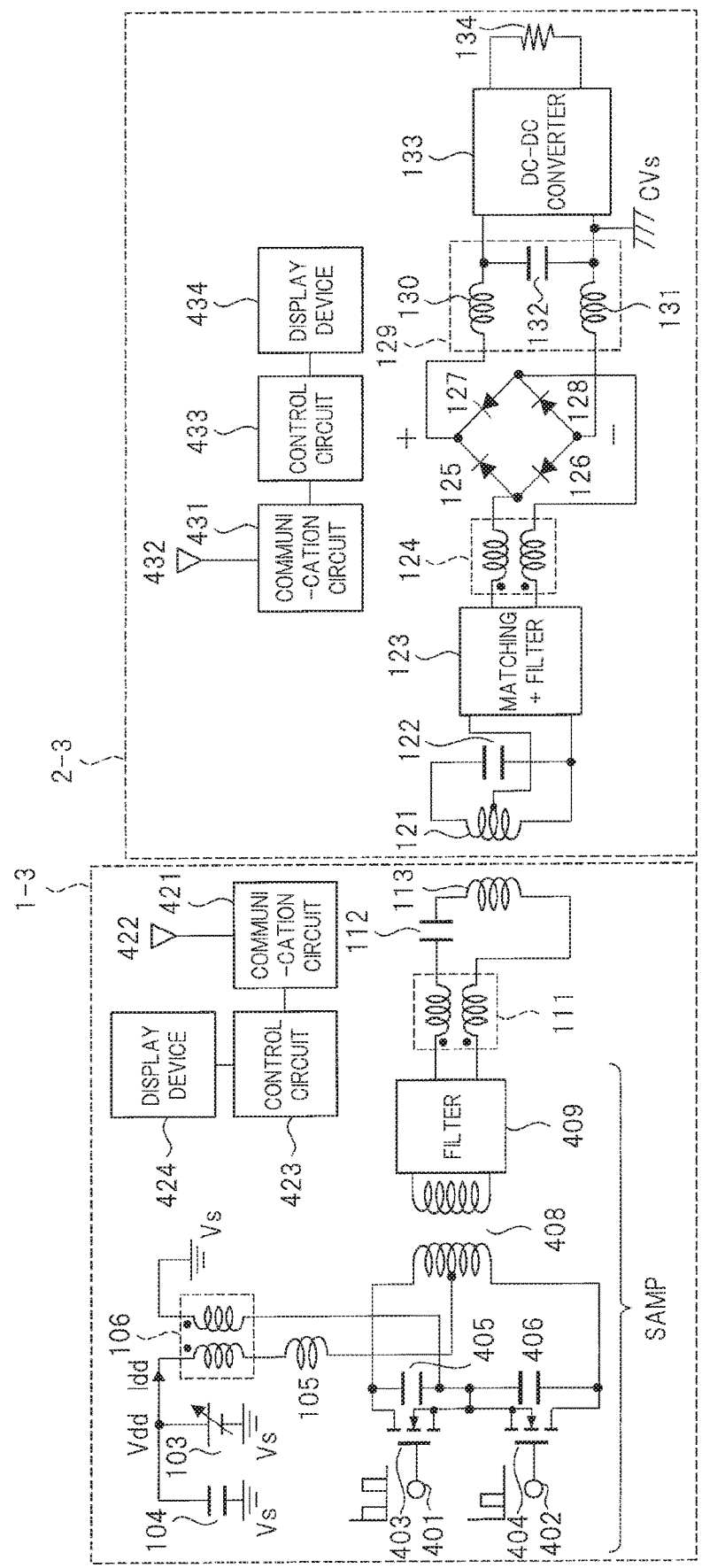
Figure 17:
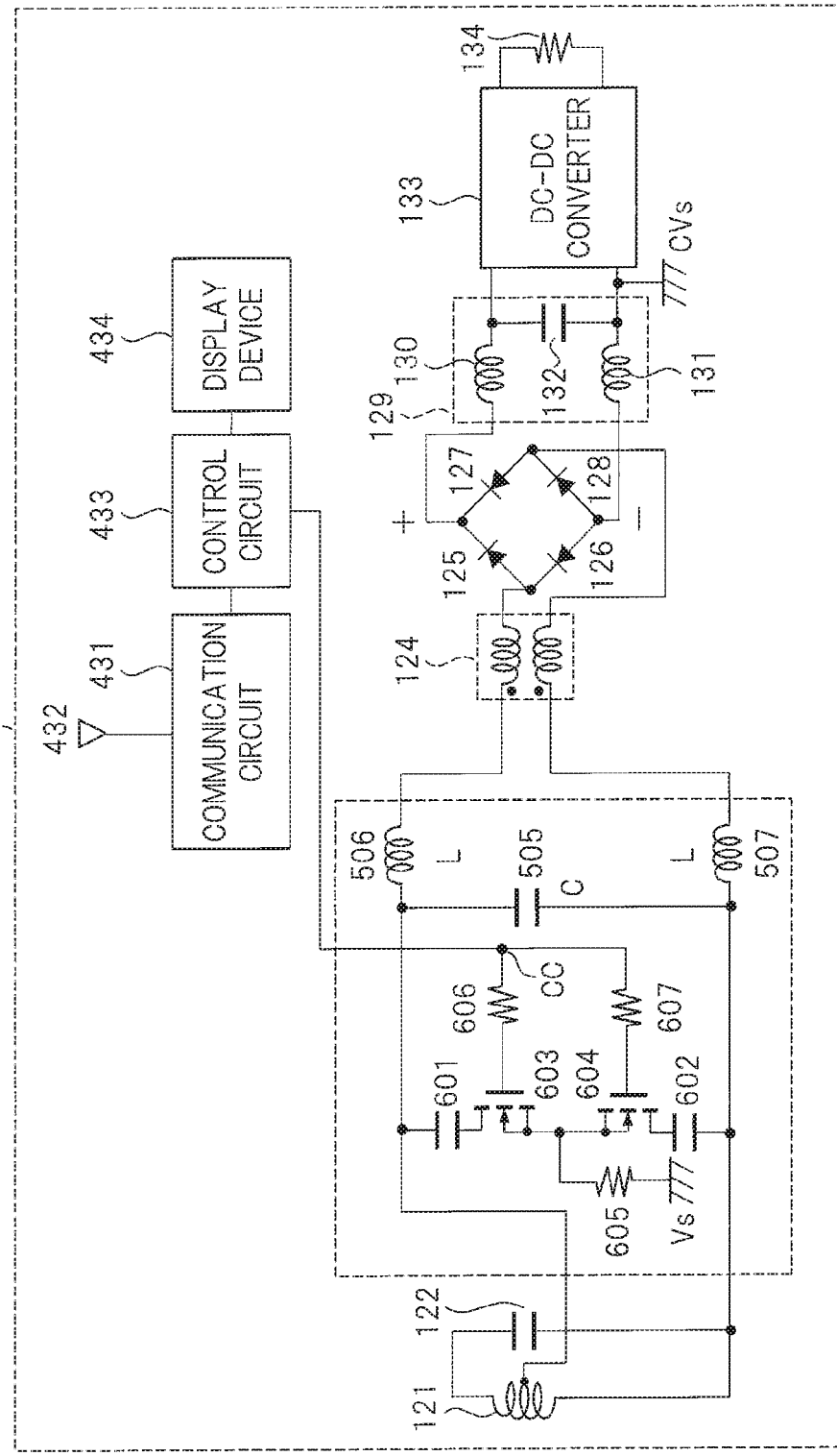
Figure 18:
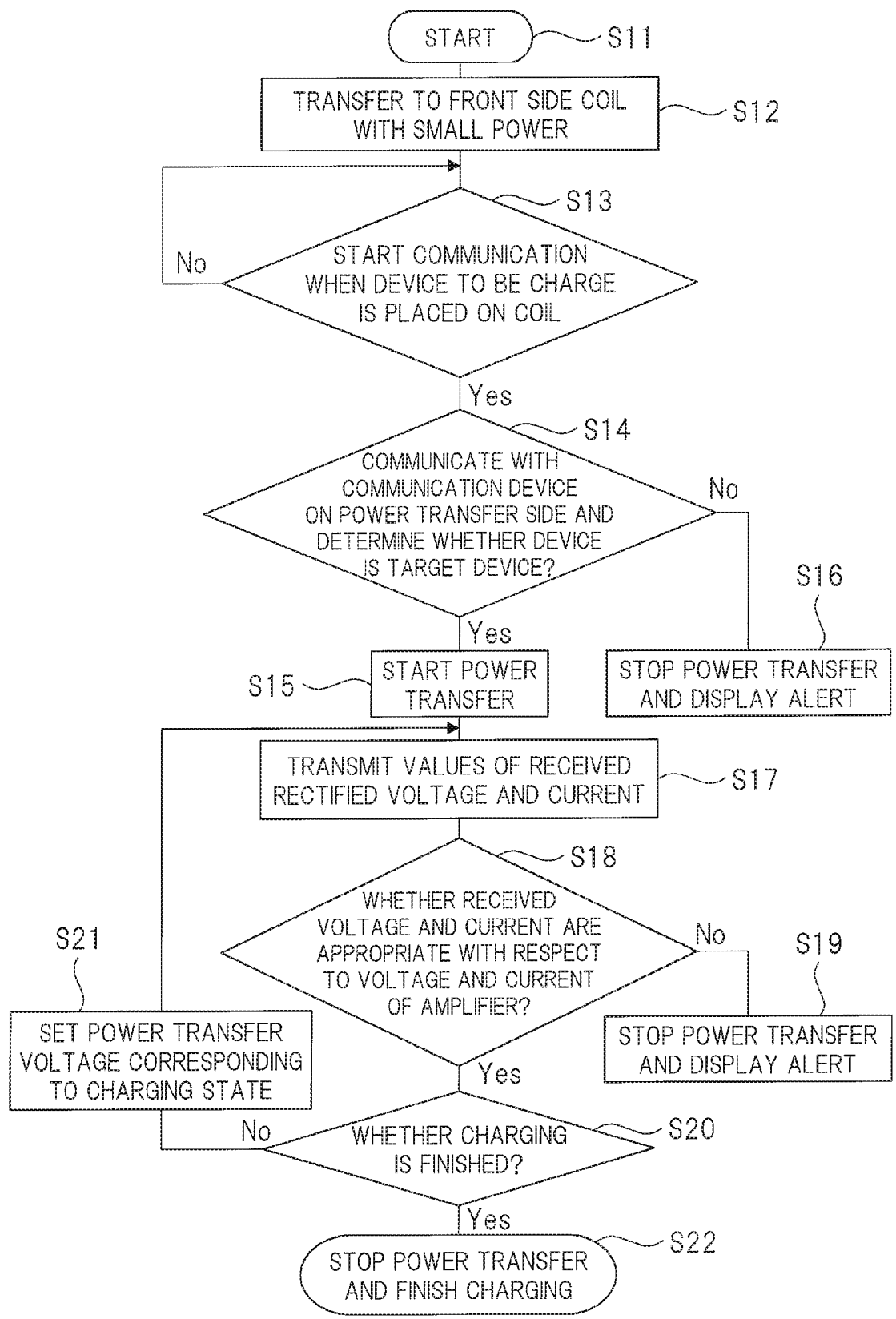
Figure 19:
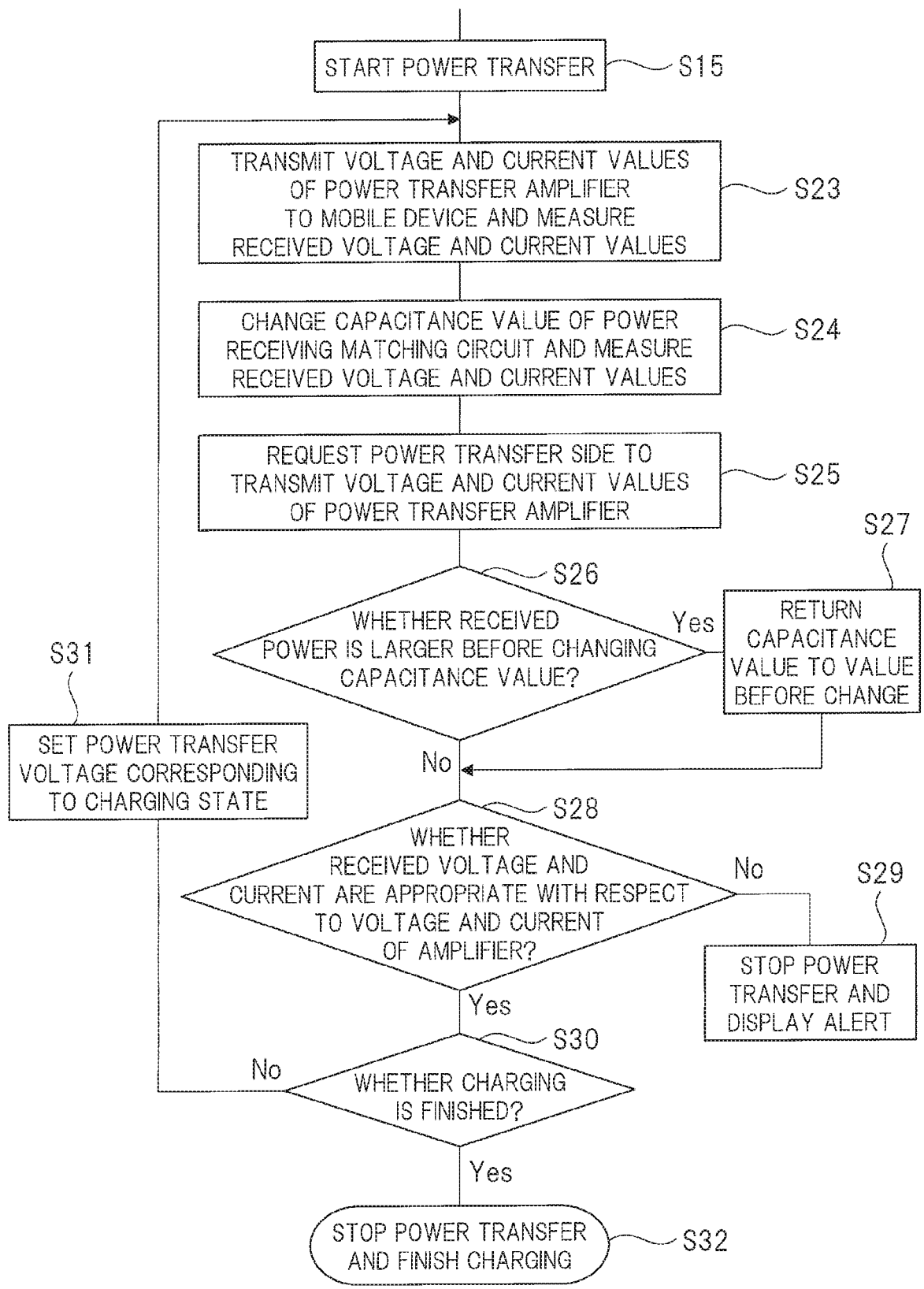
Figure 21:
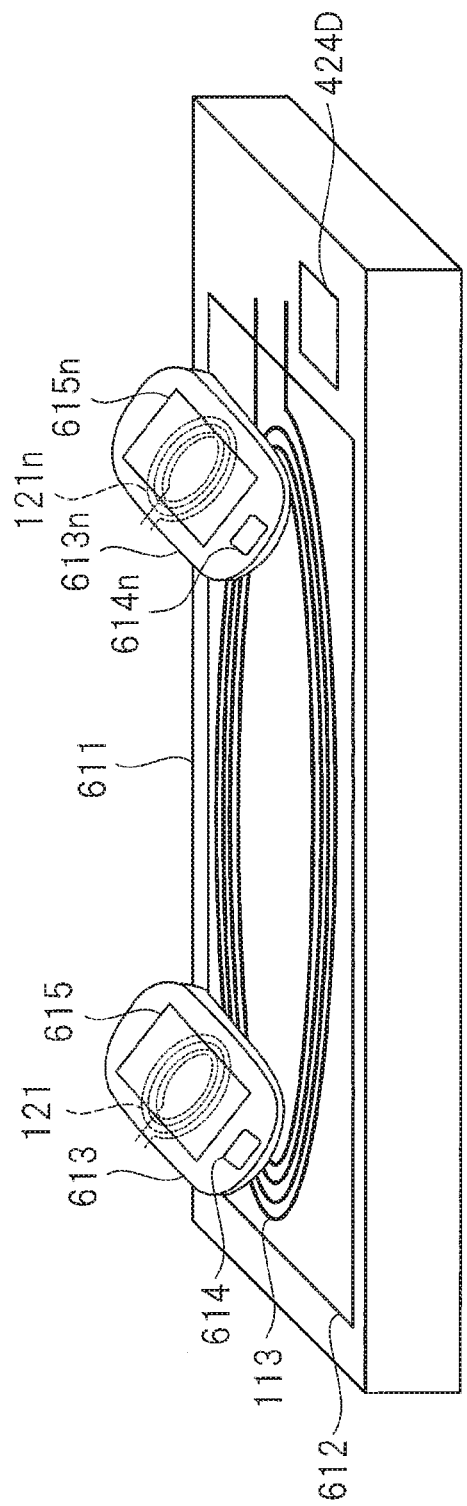
Figure 22:
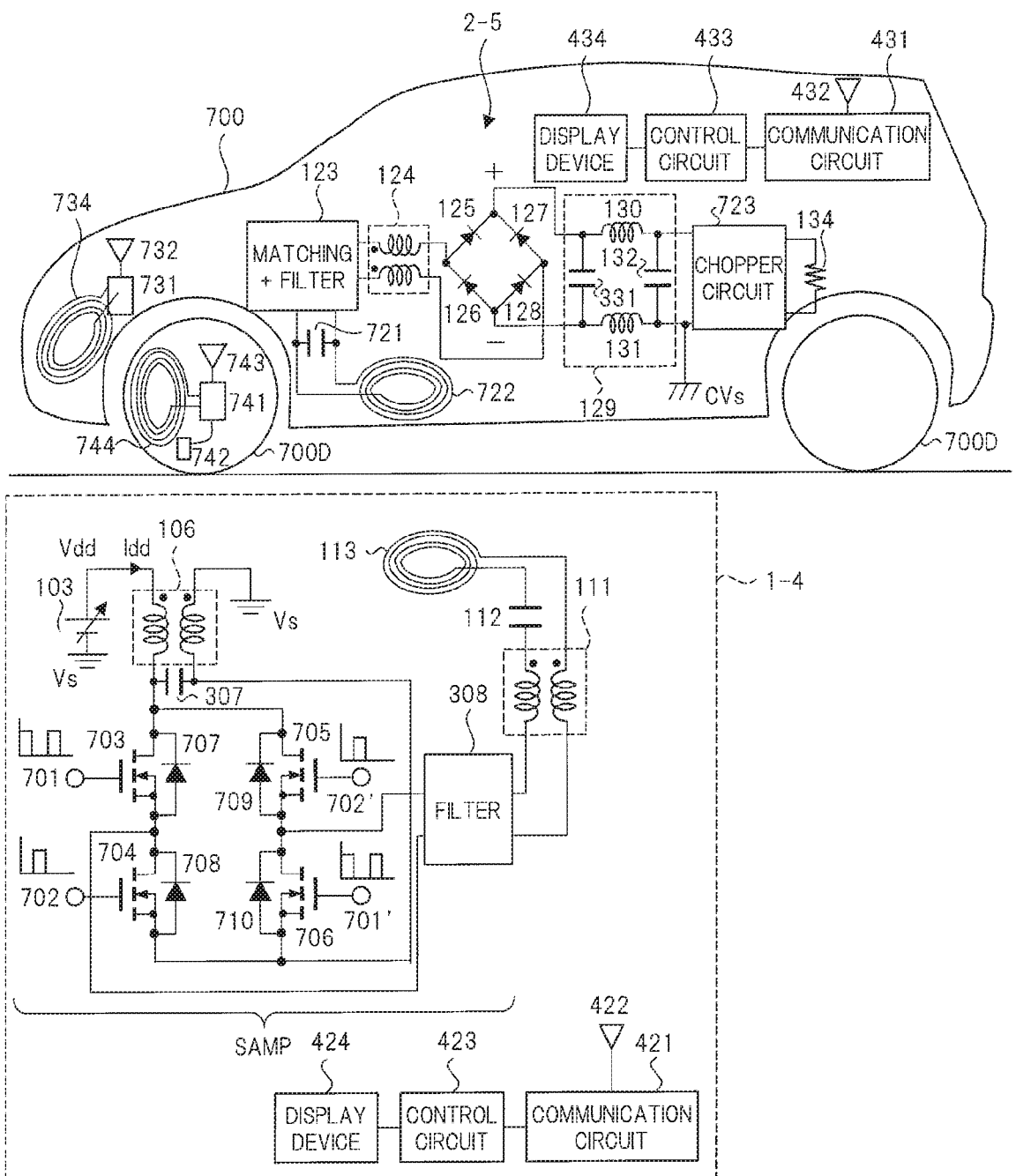
Figure 23:
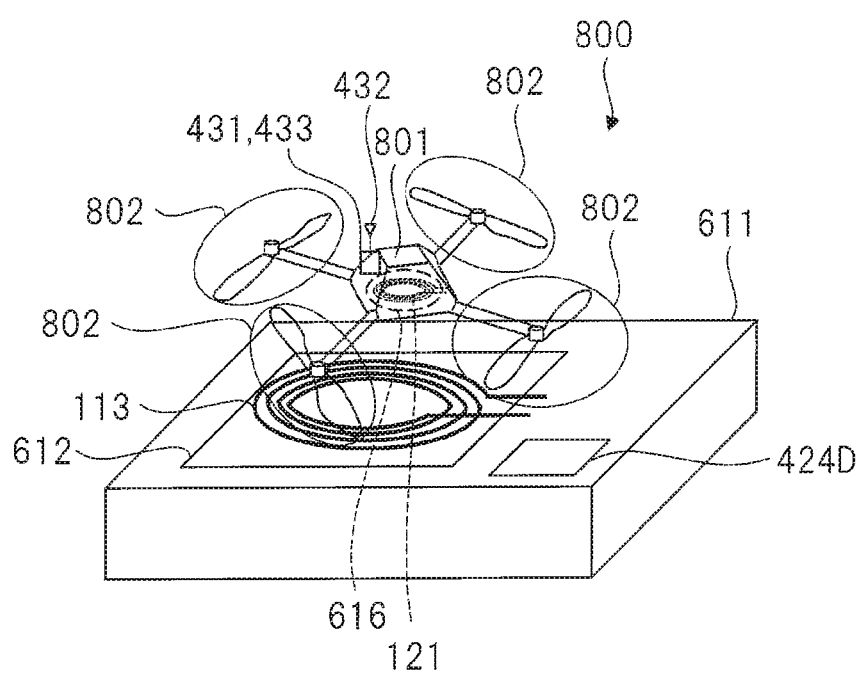

FIGS. 10(A) to 10(C) are diagrams showing a configuration of a matching circuit 123 according to the first embodiment and a fifth embodiment;

FIG. 11 is a block diagram for describing a load of a DC-DC converter;

FIG. 12 is a circuit diagram showing a configuration of a rectifier circuit and a smoothing circuit according to the first embodiment;

FIGS. 13(A) and 13(B) are waveform charts showing a ripple voltage of a contactless power receiving device;

FIG. 14 is a circuit diagram showing a configuration of a contactless power transfer and receiving device according to a second embodiment;

FIG. 15 is a circuit diagram showing a configuration of a contactless power transfer and receiving device according to a third embodiment;

FIG. 16 is a circuit diagram showing a configuration of a contactless power transfer and receiving device according to a fourth embodiment;

FIG. 17 is a circuit diagram showing a configuration of a contactless power receiving device according to a sixth embodiment;

FIG. 18 is a flowchart showing an operation of the contactless power transfer and receiving device according to the sixth embodiment;

FIG. 19 is a flowchart showing an operation of a contactless power transfer and receiving device according to the sixth embodiment;

FIGS. 20(A) and 20(B) are schematic external views showing a configuration of a contactless power transfer and receiving device according to a seventh embodiment;

FIG. 21 is a schematic external view showing a configuration of a contactless power transfer and receiving device according to a modification of the seventh embodiment;

FIG. 22 is a circuit diagram showing a configuration of a contactless power transfer and receiving device according to an eighth embodiment; and FIG. 23 is a schematic external view showing a configuration of a contactless power transfer and receiving device according to a ninth embodiment.

DETAILED DESCRIPTION OF PREFERRED EMBODIMENTS

Hereinafter, embodiments of the present invention will be described in detail with reference to the drawings. Note that the same components are denoted by the same reference characters throughout the drawings for describing the embodiments, and the repetitive description thereof will be omitted in principle.

In the following, the present invention will be described in a plurality of sections or embodiments when required as a matter of convenience. However, these sections or embodiments are not irrelevant to each other unless otherwise stated, and the one relates to the entire or a part of the other as a modified example, details, or a supplementary explanation thereof. Also, in the embodiments described below, when mentioning the number of elements (including number of pieces, values, amount, range, and the like), the number of the elements is not limited to a specific number unless otherwise stated or except the case in which the number is apparently limited to a specific number in principle, and the number larger or smaller than the specific number is also applicable. Further, in the embodiments described below, it goes without saying that the components (including element steps) are not always indispensable unless otherwise stated or except the case in which the components are apparently indispensable in principle.

Similarly, in the embodiments described below, when the shape of the components, positional relation thereof, and the like are mentioned, the substantially approximate and similar shapes and the like are included therein unless otherwise stated or except the case in which it is conceivable that they are apparently excluded in principle. The same goes for the numerical value and the range described above.

First Embodiment

Figure 1:
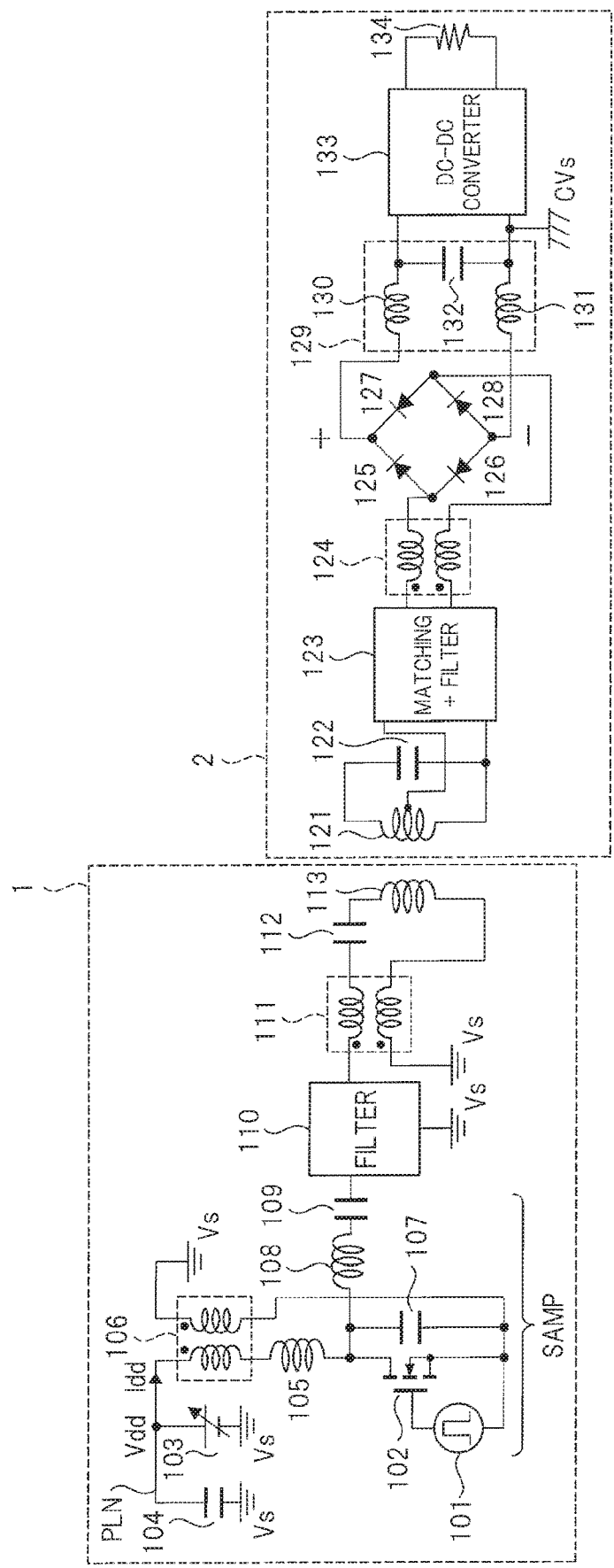
FIG. 1 is a circuit diagram showing a configuration of a contactless power transfer and receiving device according to a first embodiment.

FIG. 1 is a circuit diagram showing a configuration of a contactless power transfer and receiving device according to a first embodiment. In FIG. 1, 1 denotes a contactless power transfer device and 2 denotes a contactless power receiving device. The contactless power transfer device 1 and the contactless power receiving device 2 are coupled by inductive coupling.

<Contactless Power Transfer Device>

First, a configuration of the contactless power transfer device 1 will be described. The contactless power transfer device 1 includes a drive power supply 101, a field effect transistor (hereinafter, referred to also as MOSFET) 102, a variable voltage power supply 103, a ground capacitance element 104, a choke coil 105, common mode filters 106 and 111, capacitance elements 107 and 109, an inductor 108, a filter 110, a resonant capacitance element 112, and a power transfer coil 113.

In the first embodiment, though not particularly limited, a power transfer amplifier SAMP is composed of the drive power supply 101, the MOSFET 102, the power supply 103, the ground capacitance element 104, the choke coil 105, the inductor 108, the capacitance elements 107 and 109, and the common mode filter 106. An output of the power transfer amplifier SAMP is supplied through the filter 110 and the common mode filter 111 to a resonant circuit composed of the resonant capacitance element 112 and the power transfer coil 113.

The drive power supply 101 is connected between a gate and a source of the MOSFET 102. The drive power supply 101 supplies a drive signal whose voltage periodically changes between a high level and a low level to the gate of the MOSFET 102. Accordingly, the MOSFET 102 is periodically in an on state and an off state by the drive signal from the drive power supply 101. A drain of the MOSFET 102 is connected to the variable voltage power supply 103 and the ground capacitance element 104 through the choke coil 105 and the common mode filter 106. Also, the drain of the MOSFET 102 is connected to an input of the filter 110 through the inductor 108 and the capacitance element 109. The capacitance element 107 is connected between the source and the drain of the MOSFET 102, and the source of the MOSFET 102 is connected to the ground potential Vs through the common mode filter 106.

The power transfer amplifier SAMP constitutes a switching amplifier referred to as an E class amplifier in the first embodiment. The choke coil 105 has a value capable of regarding a reactance value as infinite at a frequency of the power transferred by the contactless power transfer device 1 (hereinafter, referred to also as power transfer frequency). Accordingly, the power is supplied from the variable voltage power supply 103 to the MOSFET 102 without affecting the transmission signal going from the drain of the MOSFET 102 to the filter 110.

In FIG. 1, Vdd denotes a power supply voltage of the power transfer amplifier SAMP, and Idd denotes an operating current (power supply current) of the power transfer amplifier SAMP. Namely, Vdd is the power supply voltage of the variable voltage power supply 103, and Idd is an operating current supplied from the variable voltage power supply 103. Since the variable voltage power supply 103 is a power supply whose voltage value is adjustable, the value of the power supply voltage Vdd is variable. The ground capacitance element 104 and the variable voltage power supply 103 are connected in parallel between the common mode filter 106 and the ground potential Vs. Here, the ground capacitance element 104 functions to suppress the voltage fluctuation of the power supply voltage Vdd.

When the MOSFET 102 is turned into an off state by the drive signal from the drive power supply 101, a resonant circuit is composed of the capacitance elements 107 and 109 and the inductor 108. The resonance frequency of the resonant circuit at this time is defined as f1. Meanwhile, when the MOSFET 102 is turned into an on state by the drive signal, a resonant circuit is composed of the capacitance element 109 and the inductor 108. When the resonance frequency of the resonant circuit at this time is defined as f2 and the power transfer frequency is defined as f0, values of the capacitance elements 107 and 109 and the inductor 108 are set so that the relation of "f2<f0<f1" is established. By setting the values in this manner, the transmission signal (power) can be efficiently supplied from the drain of the MOSFET 102 to the filter 110 by performing the switching control so that the MOSFET 102 is turned on and off by the drive signal.

The filter 110 is a low pass filter that passes the transmission signal in the band of the power transfer frequency f0 and blocks the second (double) and larger harmonics generated in the power transfer amplifier SAMP. The filter 110 is formed of, for example, a π type low pass filter.

The output of the filter 110 is supplied through the common mode filter 111 to a series resonant circuit composed of the resonant capacitance element 112 and the power transfer coil 113 connected in series. Since the resonance frequency of the series resonant circuit is matched with the power transfer frequency f0, a large resonance current flows through the power transfer coil 113 and the strong magnetic field is generated, so that the power having the power transfer frequency f0 is transferred.

Though not particularly limited, the common mode filters 106 and 111 include two coils whose magnetic fields to be generated have the same direction when the common mode signal is supplied (• in FIG. 1 indicates the direction of the magnetic field coupling). Accordingly, each of the common mode filters 106 and 111 suppresses the common mode signal from transmitting through the common mode filter when the common mode signal is supplied. For example, the common mode filter 106 suppresses the common mode signal from transmitting from the MOSFET 102 to the variable voltage power supply 103. Also, the common mode filter 111 suppresses the common mode signal from transmitting from the filter 110 to the series resonant circuit (resonant capacitance element 112, power transfer coil 113). Accordingly, the generation of the noise of the common mode signal from the contactless power transfer and receiving device 1 is reduced.

Also, in the first embodiment, the filter 110 has an impedance matching function for matching the impedance between the power transfer amplifier SAMP and the series resonant circuit (common mode filter 111, resonant capacitance element 112, power transfer coil 113).

In the contactless power transfer device 1, the power at the power transfer frequency is formed by the power transfer amplifier SAMP and this power is transferred from the power transfer coil 113.

<Contactless Power Receiving Device>

Next, the contactless power receiving device 2 will be described. The contactless power receiving device 2 includes a common mode filter 124, a resonant capacitance element 122, a power receiving coil 121, a matching circuit serving also as a filter (described as "matching+filter") 123, rectifier diodes 125, 126, 127, and 128, a smoothing circuit 129, a DC-DC converter 133, and a load resistance 134. Though the load resistance 134 is shown as a load of the DC-DC converter 133 in FIG. 1 for the convenience of description, the load of the DC-DC converter 133 is, for example, a battery or a charging circuit for charging the battery. In the first embodiment, a step-down type DC-DC converter is used as the DC-DC converter 133. Namely, the DC-DC converter 133 forms the DC voltage (for example, 5 V) which is lower than the input DC voltage.

In the first embodiment, the rectifier diodes 125, 126, 127, and 128 are connected so as to configure the rectifier circuit for performing the bridge type full-wave rectification. Namely, cathodes of the rectifier diodes 125 and 127 are connected to a rectifier output end "+" on a high potential side and anodes of the rectifier diodes 126 and 128 are connected to a rectifier output end "−" on a low potential side. In addition, an anode of the rectifier diode 125 and a cathode of the rectifier diode 126 are connected in common and are connected to one output end of the common mode filter 124, and an anode of the rectifier diode 127 and a cathode of the rectifier diode 128 are connected in common and are connected to the other output end of the common mode filter 124.

The smoothing circuit 129 includes inductors (first inductor, second inductor) 130 and 131 and a smoothing capacitance element (first smoothing capacitance element) 132. One end of the inductor 130 is connected to the rectifier output end "+" of the rectifier circuit, and one end of the inductor 131 is connected to the rectifier output end "−" of the rectifier circuit. The smoothing capacitance element 132 is connected between the other ends of the inductors 130 and 131, and the other end of the inductor 131 is connected to a casing ground CVs. Also, the other ends of the inductors 130 and 131 are connected to an input of the DC-DC converter 133. Accordingly, the rectified output on the high potential side output from the rectifier output end "+" is supplied to the DC-DC converter 133 through the inductor 130, and the rectified output on the low potential side output from the rectifier output end "−" is supplied to the DC-DC converter 133 through the inductor 131.

In the first embodiment, the power receiving coil 121 includes three taps. Namely, the power receiving coil 121 includes a first tap and a second tap connected to both ends of the coil and a third tap (intermediate tap) connected to a coil portion between (for example, in the middle of) the first tap and the second tap. The resonant capacitance element 122 is connected between the first tap and the second tap of the power receiving coil 121. Accordingly, a parallel resonant circuit is composed of the power receiving coil 121 and the resonant capacitance element 122. The output of the parallel resonant circuit is taken out from the intermediate tap of the power receiving coil 121. Namely, the intermediate tap of the power receiving coil 121 is connected to the matching circuit 123 serving also as a filter.

The output of the matching circuit 123 serving also as a filter is input to the rectifier circuit composed of the rectifier diodes 125, 126, 127, and 128 through the common mode filter 124. As described above, the rectified output of the rectifier circuit is input to the DC-DC converter 133 through the smoothing circuit 129, and the load resistance 134 is connected to the output of the DC-DC converter 133.

Values of the power receiving coil 121 and the resonant capacitance element 122 are set so that the resonance frequency of the parallel resonant circuit composed of the power receiving coil 121 and the resonant capacitance element 122 is equal to the power transfer frequency f0. Accordingly, the power transferred from the contactless power transfer device 1 is efficiently received by the power receiving coil 121. The impedance matching between the power receiving coil 121 and the rectifier circuit on a latter stage (rectifier circuit composed of the rectifier diodes 125 to 128) is achieved by the matching circuit 123 serving also as a filter. Accordingly, the power received by the power receiving coil 121 is efficiently full-wave rectified by the rectifier diodes 125 to 128, and the rectified DC power is input to the DC-DC converter 133 through the smoothing circuit 129. The input DC power is converted to a preset DC voltage value, and the power is consumed by the load resistance 134. Note that, in the contactless power receiving device 2, the parallel resonant circuit is composed of the power receiving coil 121 and the resonant capacitance element 122, and thus the impedance is extremely high at the time of resonance. In the first embodiment, the impedance is lowered by providing the intermediate tap in the power receiving coil 121 to output the received power from the intermediate tap. Accordingly, the impedance matching in the rectifier circuit 123 serving also as a filter on a latter stage is facilitated.

In the first embodiment, the drive signal at the frequency of MHz band is output from the drive power supply 101, and the power at the power transfer frequency of MHz band is transferred from the power transfer coil 113. The transferred power is received by the power receiving coil 121 of the contactless power receiving device 2 by the magnetic field coupling between the power transfer coil 113 and the power receiving coil 121. The received power is rectified by the rectifier circuit composed of the rectifier diodes 125 to 128. As a result of the rectification, the rectified output on the high potential side is output from the rectifier output end "+" of the rectifier circuit and the rectified output on the low potential side is output from the rectifier output end "−". The rectified output on the high potential side and the rectified output on the low potential side are smoothed by the smoothing circuit 129, so that the DC voltage is formed and supplied to the DC-DC converter 133. The supplied DC voltage is converted into the preset DC voltage value (first voltage) by the DC-DC converter 133 and is then output.

In the contactless power receiving device 2 according to the first embodiment, the common mode filter 124 is connected between the matching circuit 123 serving also as a filter and the rectifier circuit. The common mode filter 124 has a configuration similar to those of the common mode filters 106 and 111 described above. Therefore, even if the common mode signal is output from the matching circuit 123 serving also as a filter, for example, the transmission of the common mode signal is suppressed by the common mode filter 124. As a result, the generation of the common mode noise can be reduced in the contactless power receiving device 2. In addition, in the smoothing circuit 129, the other ends of the inductor 130 and the inductor 131 are connected by the smoothing capacitance element 132, and the other end of the inductor 131 is connected to the casing ground CVs. Since the casing ground CVs is the ground potential Vs, the high-frequency signal transmitted through the inductors 130 and 131 is short-circuited by the smoothing capacitance 132 and further flows to the casing ground CVs (ground potential Vs). Accordingly, it is possible to prevent the high-frequency signal from being output as noise from the contactless power receiving device 2.

FIG. 11 is a block diagram for describing a load of the DC-DC converter 133. A DC voltage Vbd formed by the DC-DC converter 133 is supplied to a battery VBC to charge the battery VBC. In the example shown in FIG. 11, the battery VBC is charged by being connected between the casing ground CVs and the power supply line to which the DC voltage Vbd is supplied. A desired circuit CKT operates with using the DC voltage from the battery VBC and the ground potential Vs as the operating voltage. In this case, the potential of the casing ground CVs is the ground potential Vs, and the desired circuit CKT operates with the potential difference between the ground potential Vs and the DC voltage Vbd.

<Studies by Inventors>

In a case in which a contactless power transfer and receiving device is configured and a DC voltage is formed by a DC-DC converter based on the technology described in Patent Document 1, depending on the matching state between the power transfer coil (13) and the power receiving coil (21) or the state of the load of the contactless power receiving device, the input voltage supplied to the DC-DC converter becomes a value much higher than a desired value, so that the breakdown voltage of the devices constituting the rectifier circuit (22) becomes insufficient. In addition, a case in which the DC voltage output by the DC-DC converter does not reach a desired value and the DC-DC converter does not normally operate occurs. Thus, the inventors of the present invention have conducted experiments to study about the causes. Hereinafter, the studies conducted by the inventors will be described.

<<Studies on DC-DC Converter>>

Figure 2:
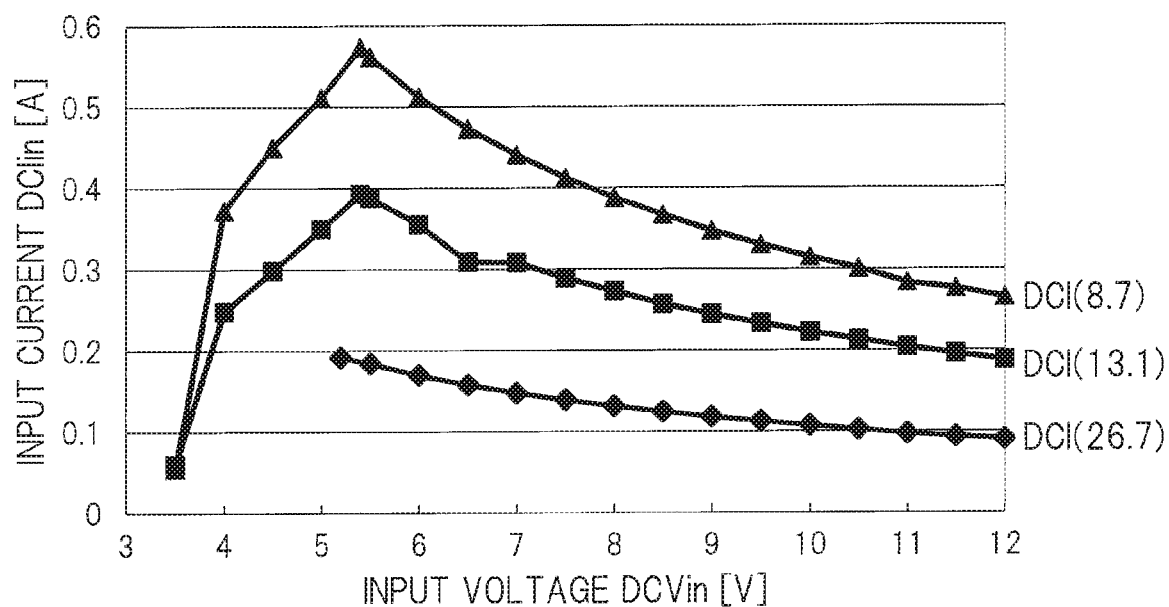
FIG. 2 is a characteristic diagram showing a relationship between an input voltage and an input current of a step-down type DC-DC converter.

FIG. 2 is a characteristic diagram showing a relationship between an input voltage of the step-down type DC-DC converter 133 shown in FIG. 1 and an input current of the DC-DC converter 133. Here, the DC-DC converter 133 is taken out from the contactless power receiving device 2 and the relationship between the input voltage and the input current is measured with respect to the DC-DC converter 133 alone.

In FIG. 2, the horizontal axis represents an input voltage DCVin supplied to the DC-DC converter 133 and the vertical axis represents an input current DCIin supplied to the DC-DC converter 133. Further, the DC-DC converter is set so as to output a voltage of 5V as a predetermined DC voltage (first voltage) when the input voltage DCVin is supplied.

In FIG. 2, DCI (8.7) indicates an input current curve in a case in which a resistance of 8.7Ω is connected as a load to the DC-DC converter 133. When described with reference to FIG. 1, it indicates the case in which the resistance of 8.7Ω is connected as the load resistance 134, and the input current DCIin flowing to the DC-DC converter 133 changes as indicated by the input current curve DCI (8.7) when the input voltage DCVin is changed from about 3.5 V to about 12 V.

Similarly, when the resistance of 13.1Ω is connected as the load resistance 134 and the input voltage DCVin is changed from about 3.5 V to about 12 V, the input current DCIin flowing to the DC-DC converter 133 changes as indicated by an input current curve DCI (13.1). Further, when the resistance of 26.7Ω is connected as the load resistance 134 and the input voltage DCVin is changed from about 5 V to about 12 V, the input current DCIin flowing to the DC-DC converter 133 changes as indicated by an input current curve DCI (26.7).

Since the output voltage of the DC-DC converter 133 is set to 5 V, when 8.7Ω is connected as the load resistance 134, the power consumption in the load resistance 134 is about 3 W. Similarly, the power consumption in the load resistance 134 when the resistance of 13.1Ω is connected is about 2 W, and the power consumption in the load resistance 134 when the resistance of 26.7Ω is connected is about 1 W.

In FIG. 2, when a voltage of 5.5 V which is slightly higher than the output voltage value of 5V set to the DC-DC converter 133 is supplied as the input voltage DCVin, the values of the input current curves DCI (8.7), DCI (13.1), and DCI (26.7) reach the peak points. In the state where a voltage value (for example, about 4 V) lower than the input voltage (5.5 V) corresponding to the peak points is supplied as the input voltage DCVin to the DC-DC converter 133, it is conceivable that the DC-DC converter 133 does not perform the normal step-down operation. Meanwhile, in the state where a voltage value (for example, about 6 V) higher than the input voltage corresponding to the peak points is supplied as the input voltage DCVin to the DC-DC converter 133, it is conceivable that the DC-DC converter 133 performs the normal step-down operation.

In a case in which the DC-DC converter 133 performs the step-down operation and outputs the preset output voltage, the input power of the DC-DC converter 133 is almost constant if the power consumed in the load resistance 134 is constant. For example, when the load resistance 134 is 8.7Ω, the power consumption in the load resistance 134 becomes about 3 W as described above, and the input power of the DC-DC converter 133 becomes a value corresponding to about 3 W. Even when the load resistance 134 is changed to 13.1Ω and 26.7Ω, the input power of the DC-DC converter 133 similarly becomes an almost constant value corresponding to the respective power consumptions (about 2 W, about 1 W).

Since the input power of the DC-DC converter 133 is the product of the input voltage DCVin and the input current DCIin, for example, when the input voltage DCVin increases, the input current DCIin decreases. Therefore, as shown in FIG. 2, in a range of the input voltage DCVin in which the step-down operation is performed, that is, in a range equal to or higher than 5.5 V, the input current curves DCI (8.7), DCI (13.1), and DCI (26.7) decline and the input current DCIin decreases as the input voltage DCVin becomes higher. Namely, in the range in which the step-down operation is performed, the DC-DC converter 133 exhibits the negative resistance that the input current DCIin decreases as the input voltage DCVin increases. In other words, the input equivalent resistance of the DC-DC converter 133 becomes the negative resistance when performing the step-down operation.

As described above, the power consumption in the load resistance 134 and the input power of the DC-DC converter 133 correspondingly become almost constant. There are many combinations of the input voltage DCVin and the input current DCIin that generate the almost constant input power. For example, when the load resistance 134 is 8.7Ω, the combination may be the input voltage DCVin of 6 V and the input current DCIin of about 0.5 A or the combination may be the input voltage DCVin of 10 V and the input current DCIin of about 0.3 A. When the DC-DC converter 133 is caused to perform the step-down operation, the input voltage and the input current converge to any of the plurality of combinations (combinations of the input voltage DCVin and the input current DCIin). Although the case in which the load resistance 134 is 8.7Ω has been described, a plurality of combinations are similarly present even in the cases of the other resistance values such as 13.1Ω and 26.7Ω, and the input voltage and the input current converge to any of the combinations.

Also, when the case in which the load resistance 134 is 8.7Ω is considered, two values of 4.2 V and 7.6 V are present as the value of the input voltage DCVin which makes the input current DCIin be 0.4 A as shown in FIG. 2. In this case, the input voltage DCVin of 7.6 V is a value capable of making the DC-DC converter 133 perform the step-down operation, but the input voltage DCVin of 4.2 V is a value incapable of making the DC-DC converter 133 perform the step-down operation. Thus, it can be seen that there is a case in which it is difficult to make the DC-DC converter 133 normally operate (step-down operation) depending on the combination for convergence. Of course, when the DC-DC converter 133 does not normally operate, the preset desired output voltage (5 V) is not formed by the DC-DC converter 133.

Figure 3:
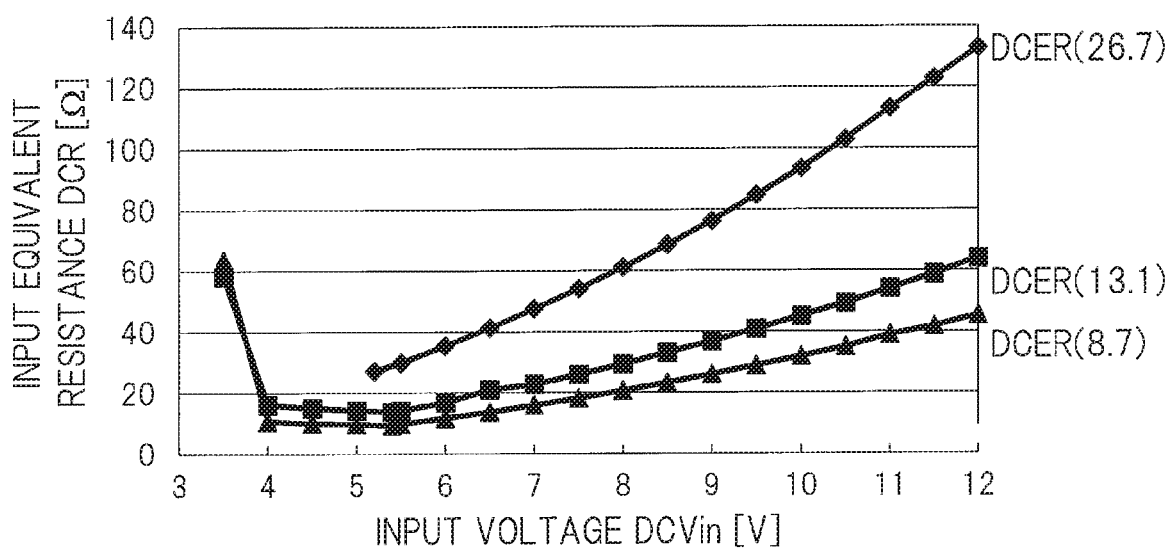
FIG. 3 is a characteristic diagram showing a relationship between an input voltage and an input equivalent resistance of a DC-DC converter.

FIG. 3 is a characteristic diagram showing a relationship between an input voltage and an input equivalent resistance of the DC-DC converter 133. FIG. 3 is created based on FIG. 2. In FIG. 3, the horizontal axis represents the input voltage DCVin of the DC-DC converter 133, and the vertical axis represents the input equivalent resistance DCR of the DC-DC converter 133. In FIG. 3, DCER (8.7) is an input equivalent resistance curve indicating the change in the input equivalent resistance when the resistance of 8.7Ω is connected as the load resistance 134 and the input voltage DCVin is changed. Similarly, DCER (13.1) is an input equivalent resistance curve indicating the change in the input equivalent resistance when the resistance of 13.1Ω is connected as the load resistance 134 and the input voltage DCVin is changed, and DCER (26.7) is an input equivalent resistance curve indicating the change in the input equivalent resistance when the resistance of 26.7Ω is connected as the load resistance 134 and the input voltage DCVin is changed.

Here, the input equivalent resistance is an equivalent input resistance of the DC-DC converter 133 obtained by dividing the corresponding input voltage DCVin shown in FIG. 2 by the input current DCIin. For example, the input equivalent resistance curve DCER (8.7) is obtained by dividing the input voltage DCVin at that time by the value of the input current DCIin indicated by the corresponding input current curve DCI (8.7). The other input equivalent resistance curves DCER (13.1) and DCER (26.7) are also obtained in the same manner.

As shown in FIG. 3, in a case in which the resistance of 8.7Ω or the resistance of 13.1Ω is connected as the load resistance 134, even when the input voltage DCVin is changed in a wide range of about 4V to 7 V, the values of the input equivalent resistances DCR indicated by the input equivalent resistance curves DCER (8.7) and DCER (13.1) just change in the range of about 10Ω to 22Ω. Namely, even when the input voltage DCVin is changed in the range of 4 V to 7 V, the slope of the input equivalent resistance curves DCER (8.7) and DCER (13.1) is almost zero. Therefore, in the case in which the resistance of 8.7Ω or the resistance of 13.1Ω is connected as the load resistance 134, the input voltage DCVin is selected in the wide range of 4 V to 7 V and may converge in this wide range.

<<Relationship Between Power Transfer Amplifier SAMP and DC-DC Converter 133>>

In the contactless power transfer and receiving device, the power transfer coil 113 and the power receiving coil 121 shown in FIG. 1 are magnetically coupled. Accordingly, the input power supplied to the DC-DC converter 133 can be changed by changing the voltage value of the variable voltage power supply 103 in the power transfer amplifier SAMP shown in FIG. 1, that is, the value of the power supply voltage Vdd of the power transfer amplifier SAMP.

Figure 4:
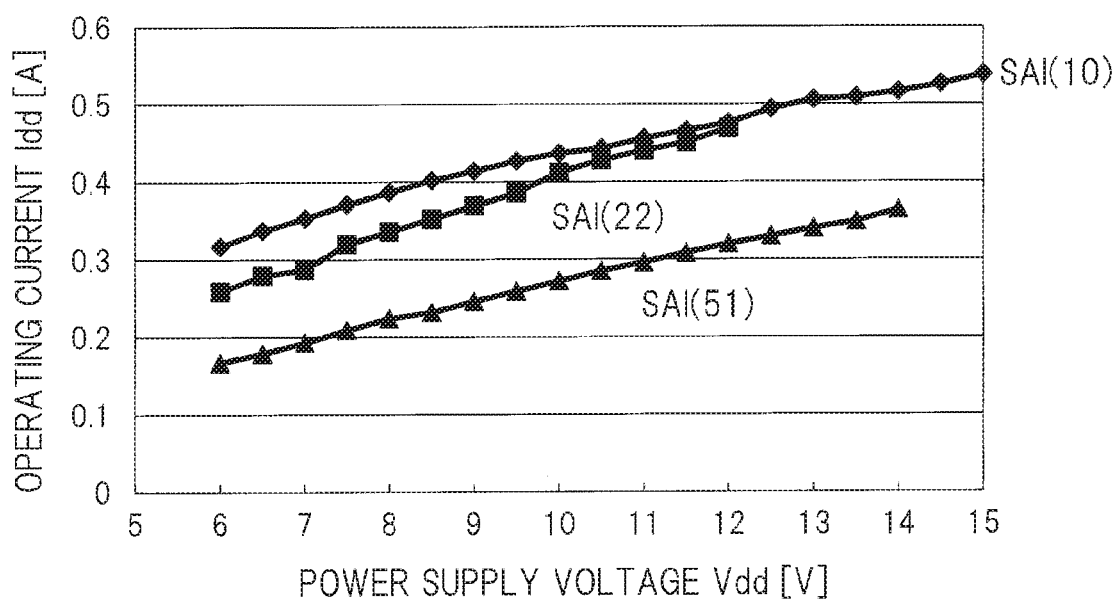
FIG. 4 is a characteristic diagram showing a relationship between a power supply voltage and an operating current of a power transfer amplifier.

FIG. 4 is a characteristic diagram created by removing the DC-DC converter 133, connecting the resistance to the smoothing circuit 129 instead of the DC-DC converter 133, and measuring the relationship between the power supply voltage Vdd and the operating current Idd of the power transfer amplifier SAMP in the contactless power receiving device 2 shown in FIG. 1. Here, the resistance connected to the smoothing circuit 129 instead of the DC-DC converter 133 can be regarded as the input equivalent resistance of the DC-DC converter 133 described with reference to FIG. 3.

In FIG. 4, the horizontal axis represents the power supply voltage Vdd of the variable voltage power supply 103 of the power transfer amplifier SAMP (see FIG. 1), and the vertical axis represents the operating current Idd of the power transfer amplifier SAMP. In addition, in FIG. 4, SAI (51) is a power transfer amplifier current curve indicating the change in the operating current Idd when the power supply voltage Vdd is changed in the state in which a resistance of 51Ω is connected as the input equivalent resistance to the smoothing circuit 129 instead of the DC-DC converter 133 in FIG. 1. Similarly, the change in the operating current Idd when the power supply voltage Vdd is changed in the state in which a resistance of 22Ω is connected as the input equivalent resistance to the smoothing circuit 129 instead of the DC-DC converter 133 is indicated by a power transfer amplifier current curve SAI (22). Further, the change in the operating current Idd when the power supply voltage Vdd is changed in the state in which a resistance of 10Ω is connected as the input equivalent resistance to the smoothing circuit 129 instead of the DC-DC converter 133 is indicated by a power transfer amplifier current curve SAI (10).

Namely, FIG. 4 shows the relationship between the change in the power supply voltage Vdd and the change in the operating current Idd of the power transfer amplifier SAMP for each input equivalent resistance when the input equivalent resistances having different resistance values are connected to the smoothing circuit 129 instead of the DC-DC converter 133. Therefore, FIG. 4 shows the dependency between the change in the operating current Idd flowing with respect to the change in the power supply voltage Vdd of the power transfer amplifier SAMP and the input equivalent resistance of the DC-DC converter 133.

Figure 10:
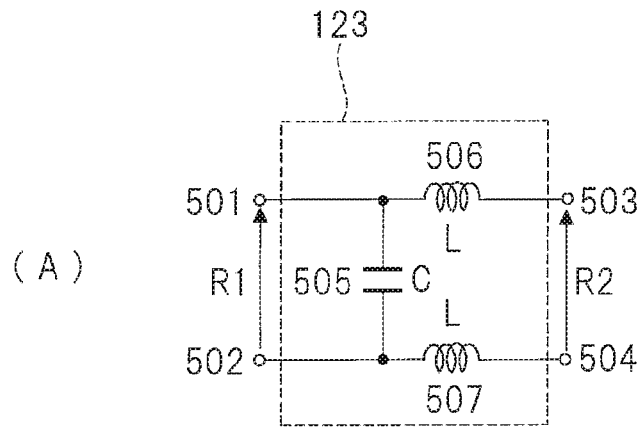
Figure 10:
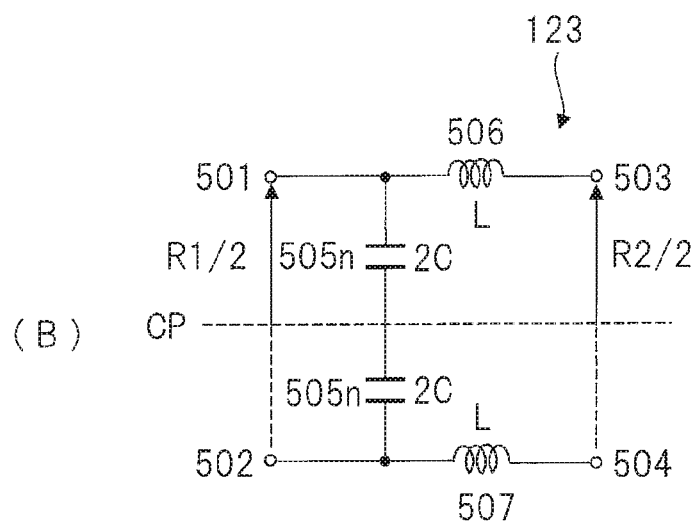

Here, the matching circuit serving also as a filter (hereinafter, simply referred to also as matching circuit) 123 shown in FIG. 1 has a configuration shown in FIG. 10(A). Since FIG. 10 will be described in a fifth embodiment later, only FIG. 10(A) is simply described. FIG. 10(A) is a circuit diagram showing the configuration of the matching circuit 123. The matching circuit 123 includes a capacitance element 505 and inductors 506 and 507. When described with reference to FIG. 1 and FIG. 10, the inductor 506 is connected between an input terminal 501 and an output terminal 503 of the matching circuit 123, and the inductor 507 is connected between an input terminal 502 and an output terminal 504 of the matching circuit 123. Also, the capacitance element 505 is connected between the input terminals 501 and 502. The input terminal 501 of the matching circuit 123 is connected to the intermediate tap of the power receiving coil 121, and the input terminal 502 is connected to the tap (second tap) connected to the other end of the power receiving coil 121. In addition, the output terminal 503 of the matching circuit 123 is connected to a connecting portion between the rectifier diode 125 and the rectifier diode 126, and the output terminal 504 is connected to a connecting portion between the rectifier diode 127 and the rectifier diode 128. The filter is composed of the capacitance element 505 and the inductors 506 and 507 and the impedance matching is achieved.

Description will be given with reference to FIG. 4 again. The characteristics shown in FIG. 4 are measured in the state where a value of the capacitance element 505 constituting the matching circuit 123 is set to 308 pF, a value of each of the inductors 506 and 507 is set to 0.95 uH, a value of the smoothing capacitance element 132 in the smoothing circuit 129 is set to 22 uF, and the inductors 130 and 131 are short-circuited.

Since the inductors 130 and 131 in the smoothing circuit 129 are short-circuited, the rectifier circuit and the input equivalent resistance corresponding to the DC-DC converter 133 are in a state of being connected by a signal line instead of the coil. Since the rectifier circuit and the DC-DC converter 133 are connected by the signal line, the configuration is similar to that shown in FIG. 1 of Patent Document 1. Therefore, FIG. 4 can be regarded as showing the dependency between the change in the operating current Idd flowing with respect to the change in the power supply voltage Vdd of the power transfer amplifier SAMP and the input equivalent resistance of the DC-DC converter 133 in the configuration similar to that shown in FIG. 1 of Patent Document 1.

Figure 5:
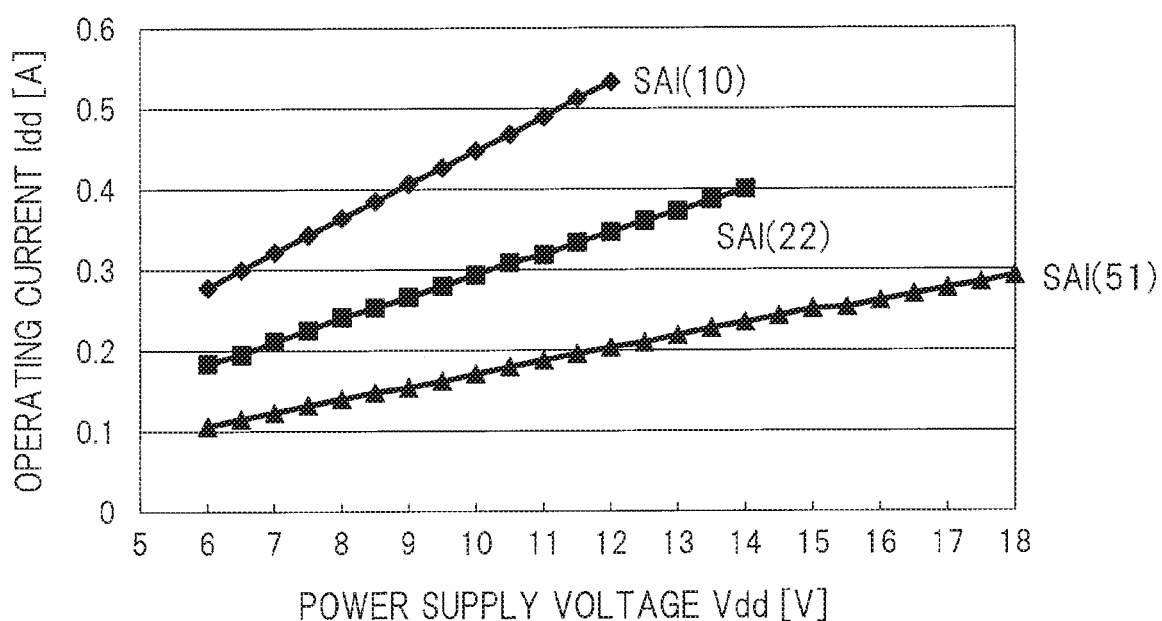
FIG. 5 is a characteristic diagram showing a relationship between a power supply voltage and an operating current of a power transfer amplifier.
Figure 6:
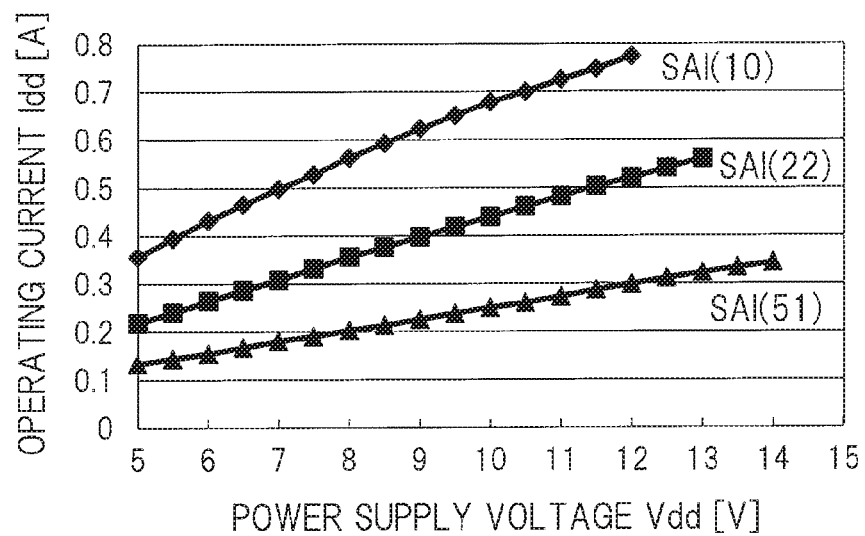
FIG. 6 is a characteristic diagram showing a relationship between a power supply voltage and an operating current of a power transfer amplifier.

Each of FIG. 5 and FIG. 6 is a characteristic diagram created by connecting a resistance of 51Ω, 22Ω, and 10Ω corresponding to the input equivalent resistance of the DC-DC converter 133 to the smoothing circuit 129 instead of the DC-DC converter 133 shown in FIG. 1 and measuring the operating current Idd of the power transfer amplifier SAMP while changing the value of the power supply voltage Vdd of the power transfer amplifier SAMP in the same manner as FIG. 4. Also in FIG. 5 and FIG. 6, the horizontal axis and the vertical axis represent the power supply voltage Vdd and the operating current Idd of the power transfer amplifier SAMP as in FIG. 4. Similarly, the characteristics in the case in which the resistance of 51Ω is used as the input equivalent resistance are indicated by the power transfer amplifier current curve SAI (51), the characteristics in the case in which the resistance of 22Ω is used as the input equivalent resistance are indicated by the power transfer amplifier current curve SAI (22), and the characteristics in the case in which the resistance of 10Ω is used as the input equivalent resistance are indicated by the power transfer amplifier current curve SAI (10).

The characteristics in FIG. 5 and FIG. 6 are obtained by setting the values of the elements of the smoothing circuit 129 and the matching circuit 123 shown in FIG. 1 and FIG. 10 to the values different from those set at the time of obtaining the characteristics of FIG. 4.

Namely, when the characteristics shown in FIG. 5 are obtained, coils are used as the inductors 130 and 131 in the smoothing circuit 129 shown in FIG. 1, and values thereof are set to 3.3 uH so as to function as inductors. At this time, a value of the capacitance element 505 in the matching circuit 123 shown in FIG. 10 and values of the inductors 506 and 507 are set to the same values as those set at the time when the characteristics shown in FIG. 4 are obtained.

Also, when the characteristics shown in FIG. 6 are obtained, the inductors 130 and 131 in the smoothing circuit 129 shown in FIG. 1 are formed of signal lines that short-circuits the rectifier circuit and the input equivalent resistance without using coils as is the case with obtaining the characteristics shown in FIG. 4. At this time, values of the inductors 506 and 507 in the matching circuit 123 shown in FIG. 10 are set to the same values as those set at the time when the characteristics shown in FIG. 4 are obtained, and a value of the capacitance element 505 is set to 275 pF which is smaller than the value of 308 pF set at the time when the characteristics shown in FIG. 4 are obtained.

The differences in the values which are set when obtaining the characteristics shown in FIGS. 4 to 6 are summarized as follows. The characteristics shown in FIG. 5 are measured by setting the values of the inductors 130 and 131 in the smoothing circuit 129 to 3.3 uH so that the inductors 130 and 131 function as inductors with respect to the characteristics shown in FIG. 4. In addition, the characteristics shown in FIG. 6 are measured by setting the value of the capacitance element 505 in the matching circuit 123 to be small with respect to the characteristics shown in FIG. 4.

In FIG. 4, regardless of whether the input equivalent resistance is 10Ω, 22Ω, or 51Ω, the curves each have a slope in which the operating current Idd of the power transfer amplifier SAMP increases when the power supply voltage Vdd of the power transfer amplifier SAMP is increased. However, when the power transfer amplifier current curves SAI (10) and SAI (22) having the input equivalent resistances of 10Ω and 22Ω are considered, the slopes become almost the same when the power supply voltage Vdd is 11 V or higher, and the values of the operating current Idd flowing in the power transfer amplifier SAMP become almost the same.

This means that, when the power supply voltage Vdd of the power transfer amplifier SAMP is 11 V or higher, the power supply voltage Vdd and the operating current Idd of the power transfer amplifier SAMP change in almost the same manner and are hardly different from each other even when the input equivalent resistance of the DC-DC converter 133 changes from about 10Ω to about 22Ω. In the characteristics shown in FIG. 4, the operating current Idd flowing through the power transfer amplifier SAMP increases around 450 mA nearly in proportion to the power supply voltage Vdd of the power transfer amplifier SAMP.

Referring to FIG. 3, it can be seen that the input voltage DCVin at the time when the input equivalent resistance of the DC-DC converter 133 is in the range of about 10Ω to about 22Ω changes in a relatively wide range of about 4 V to 7 V when the load resistance 134 is 8.7Ω, and 13.1Ω. Also, assuming that the efficiency of the power transfer amplifier SAMP is 80%, the efficiency between the power transfer coil 113 and the power receiving coil 121 is 90%, and the efficiency of the rectifier circuit is 90%, the operating current Idd of the power transfer amplifier SAMP when the input equivalent resistance is 10Ω or 22Ω and the power supply voltage Vdd of the power transfer amplifier SAMP is 11 V or higher is converted to the input current DCIin of about 0.4 A to 0.5 A.

Returning to the characteristics shown in FIG. 2, as can be seen from the input current curve DCI (8.7), when the resistance of 8.7Ω is connected as the load resistance 134, the point in which the input current DCIin in the range of about 0.4 A to 0.5 A can be achieved when the input voltage DCVin of the DC-DC converter 133 is in a range of about 4 V to 7 V is present in both of the case in which the input voltage DCVin is higher than 5.5 V and the case in which the input voltage DCVin is lower than 5.5 V. Namely, the combination of the input voltage DCVin and the input current DCIin with which the DC-DC converter 133 normally performs the step-down operation and the combination of the input voltage DCVin and the input current DCIin with which the DC-DC converter 133 does not normally perform the step-down operation are both present. In other words, both of the convergence point where the DC-DC converter 133 can normally perform the step-down operation and the convergence point where the DC-DC converter 133 cannot normally perform the step-down operation are present.

In this case, in order to converge only to the point where the DC-DC converter 133 normally operates, for example, it is conceivable to increase the power supply voltage Vdd of the power transfer amplifier SAMP. However, when the power supply voltage Vdd is increased, a high voltage is applied to the rectifier diodes 125 to 128 constituting the rectifier circuit, and there is a possibility that the voltage exceeds the breakdown voltage of the rectifier diodes to destroy them. In addition, there is a possibility that the voltage exceeds the allowable input voltage range of the DC-DC converter.

Meanwhile, in a case where the values of the inductors 130 and 131 of the smoothing circuit 129 are set to 3.3 uH to make them function as inductors, when the input equivalent resistance is changed to 10Ω, 22Ω, and 51Ω, the slopes of the power transfer amplifier current curves SAI (10), SAI (22), and SAI (51) corresponding to each input equivalent resistance differ from each other as shown in FIG. 5. Namely, the change rate of the operating current Idd flowing through the power transfer amplifier SAMP with respect to the change in the power supply voltage Vdd of the power transfer amplifier SAMP differs for each input equivalent resistance. In other words, the change rate of the operating current Idd of the power transfer amplifier SAMP with respect to the change in the power supply voltage Vdd of the power transfer amplifier SAMP differs depending on the input equivalent resistance of the DC-DC converter 133. In FIG. 5, the change rate of the operating current Idd (current change rate) becomes larger as the value of the input equivalent resistance becomes smaller. Accordingly, as shown in FIG. 4, it is possible to prevent the operating currents Idd from overlapping with each other even when the input equivalent resistances differ from each other.

In addition, even in a case where the inductors 130 and 131 of the smoothing circuit 129 are provided as lines so as not to make them function as inductors, it is possible to make the slopes of the power transfer amplifier current curves SAI (10), SAI (22), and SAI (51) differ from each other for each input equivalent resistance as shown in FIG. 6 by setting the capacitance element 505 (FIG. 10) of the matching circuit 123 to 275 pF. Namely, it is possible to make the change rates (current change rates) of the operating current Idd of the power transfer amplifier SAM differ from each other as shown in FIG. 6 also by changing the value of the capacitance element 505 of the matching circuit 123.

<<Relationship Between Power Supply Voltage of Power Transfer Amplifier and Output Voltage of DC-DC Converter>>

Under the conditions of the smoothing circuit 129 and the matching circuit 123 described above, the relationship between a power transfer voltage and an inter-terminal voltage of the load resistance 134 in the contactless power transfer and receiving device shown in FIG. 1 is measured. The measurement results are shown in FIGS. 7 to 9.

Figure 7:
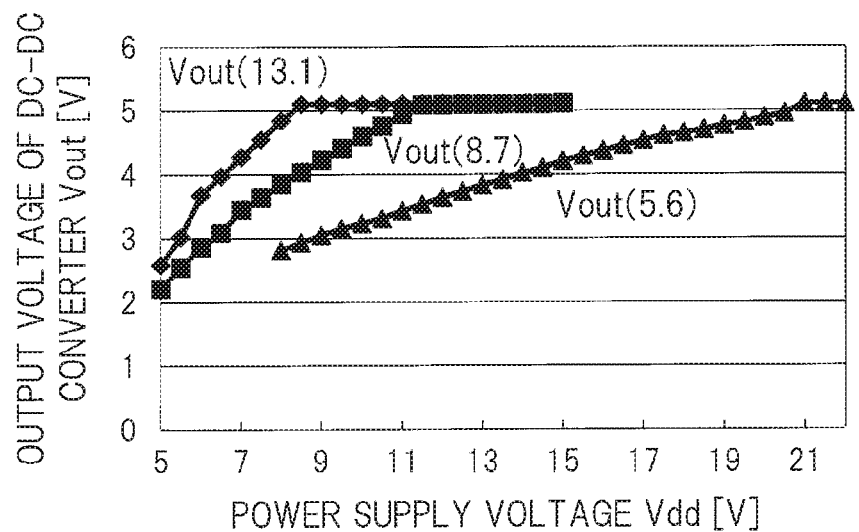
FIG. 7 is a characteristic diagram showing a relationship between a power transfer voltage and an inter-terminal voltage of a load resistance in the contactless power transfer and receiving device.
Figure 8:
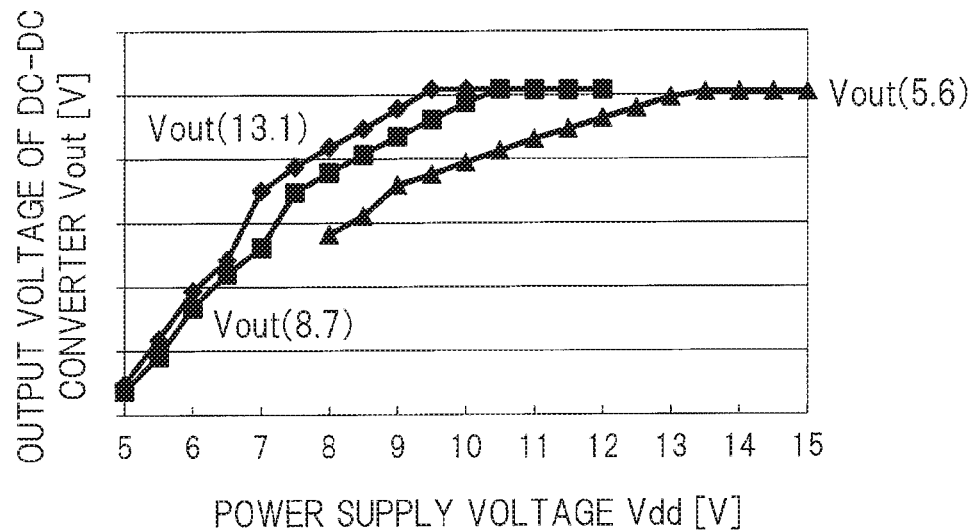
FIG. 8 is a characteristic diagram showing a relationship between a power transfer voltage and an inter-terminal voltage of a load resistance in the contactless power transfer and receiving device.
Figure 9:
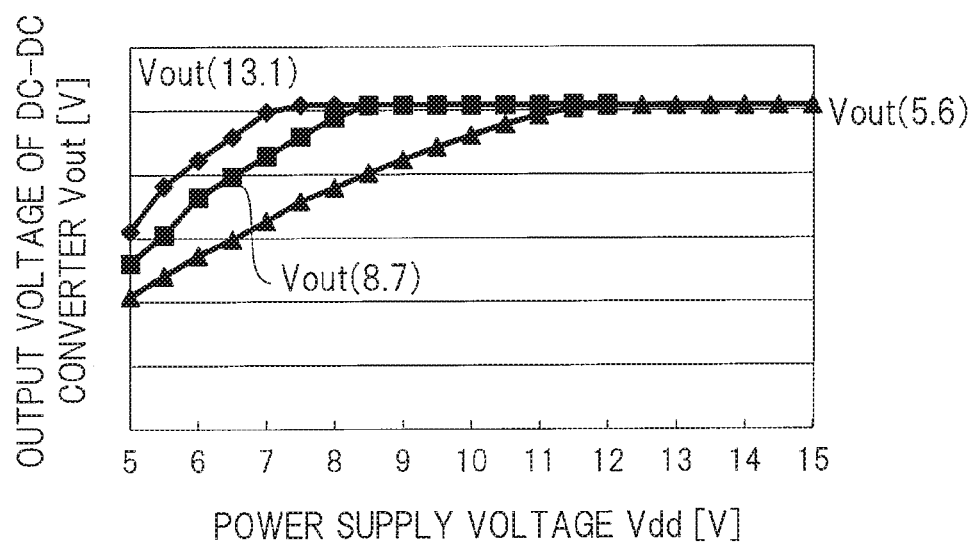
FIG. 9 is a characteristic diagram showing a relationship between a power transfer voltage and an inter-terminal voltage of a load resistance in the contactless power transfer and receiving device.

In FIGS. 7 to 9, the horizontal axis represents the power transfer voltage. The power transfer voltage here means the power supply voltage Vdd of the power transfer amplifier SAMP. Also, each vertical axis represents the inter-terminal voltage of the load resistance 134. Since the inter-terminal voltage corresponds to the output voltage Vout of the DC-DC converter 133, the vertical axis is shown as the output voltage Vout of the DC-DC converter in these drawings. In FIGS. 7 to 9, Vout (13.1) denotes an output voltage curve indicating the change in the output voltage Vout of the DC-DC converter 133 when the power supply voltage Vdd of the power transfer amplifier SAMP is changed in the state in which resistance of 13.1Ω is connected as the load resistance 134 shown in FIG. 1. At this time, the DC-DC converter 133 is set so that 5 V is output as the output voltage (desired voltage), and the power transfer frequency f0 is set to 6.78 MHz. Also, an output voltage curve when the output voltage and the power transfer frequency of the DC-DC converter 133 are set to the same values and resistance of 8.7Ω is connected as the load resistance 134 is denoted as Vout (8.7), and an output voltage curve when resistance of 5.6Ω is connected is denoted as Vout (5.6).

FIG. 7 shows the output voltage curves Vout (13.1), Vout (8.7), and Vout (5.6) measured in the state in which the conditions of the smoothing circuit 129 and the matching circuit 123 are set to those of FIG. 4. Also, FIG. 8 shows the output voltage curves Vout (13.1), Vout (8.7), and Vout (5.6) measured in the state in which the conditions of the smoothing circuit 129 and the matching circuit 123 are set to those of FIG. 5. Further, FIG. 9 shows the output voltage curves Vout (13.1), Vout (8.7), and Vout (5.6) measured in the state in which the conditions of the smoothing circuit 129 and the matching circuit 123 are set to those of FIG. 6.

Referring to FIG. 7, as can be seen from the output voltage curve Vout (5.6), in the case in which the resistance of 5.6Ω is connected as the load resistance 134, the output voltage Vout does not reach the voltage of 5 V set to the DC-DC converter 133 unless the power supply voltage Vdd of the power transfer amplifier SAMP is increased to about 21 V. Namely, the DC-DC converter 133 does not perform the normal step-down operation unless the power supply voltage Vdd of the power transfer amplifier SAMP is increased to about 21 V. Meanwhile, in FIG. 8 and FIG. 9, as can be seen from the output voltage curve Vout (5.6) shown in each drawing, in the case in which the resistance of 5.6Ω is connected as the load resistance 134, the output voltage Vout reaches 5 V when the power supply voltage Vdd of the power transfer amplifier SAMP is increased to about 12 to 13.5 V. Namely, in FIG. 8 and FIG. 9, it can be seen that the DC-DC converter 133 can perform the normal step-down operation when the power supply voltage Vdd is increased to about 12 to 13.5 V without increasing it to 21 V.

As described above, in the case in which the conditions of the smoothing circuit 129 and the matching circuit 123 are set to the values described with reference to FIG. 4, when the resistance of 5.6Ω is connected as the load resistance 134, the DC-DC converter 133 does not perform the normal step-down operation unless the power supply voltage Vdd of the power transfer amplifier SAMP is increased to a high voltage. In other words, unless the power supply voltage Vdd of the power transfer amplifier SAMP is increased to a high voltage, the desired output voltage is not formed by the DC-DC converter 133. Meanwhile, when the power supply voltage Vdd of the power transfer amplifier SAMP is increased, the voltage supplied to the rectifier circuit composed of the rectifier diodes 125 to 128 becomes high, and there is a fear that the voltage exceeds the breakdown voltage of the rectifier diodes. If the voltage exceeds the breakdown voltage, there is a fear that the rectifier diode is destroyed.

Meanwhile, in the case in which the conditions of the smoothing circuit 129 and the matching circuit 123 are set to the values described with reference to FIG. 5 and FIG. 6, even when the resistance of 5.6Ω is connected as the load resistance 134, the power supply voltage Vdd of the power transfer amplifier SAMP which starts the normal step-down operation in the DC-DC converter 133 can be lowered. Accordingly, it is possible to reduce the occurrence of the state in which the DC-DC converter 133 does not perform the normal step-down operation. Also, it is possible to reduce the destruction of the rectifier diode.

The inventors have studied about the reasons why the DC-DC converter 133 starts the normal step-down operation by setting the matching circuit 123 and the smoothing circuit 129 as described with reference to FIG. 5 and FIG. 6 even when the power supply voltage Vdd of the power transfer amplifier SAMP is low and have inferred as follows.

First, the case in which the smoothing circuit 129 is provided with the inductors 130 and 131 of 3.3 uH will be described. The characteristics in this case are shown in FIG. 5 and FIG. 8.

The rectifier circuit composed of the rectifier diodes 125 to 128 can be equivalently regarded as being composed of resistance and capacitance. FIG. 12 is a circuit diagram showing the configuration of the rectifier circuit and the smoothing circuit 129. In FIG. 12, the rectifier circuit composed of the rectifier diodes 125 to 128 is represented by equivalent resistances rR and equivalent capacitances rC. The rectifier circuit rCKT represented by the equivalent resistances rR and the equivalent capacitances rC is connected to the DC-DC converter 133 through the smoothing circuit 129. Also, the output terminal of the matching circuit 123 is connected to the rectifier circuit rCKT through the common mode filter.

The high-frequency power of the power transfer frequency received by the power receiving coil 121 is supplied as a rectified output having the frequency corresponding to the power transfer frequency through the equivalent resistance rR and the equivalent capacitance rC from the matching circuit 123 to the inductors 130 and 131 in the smoothing circuit 129. Therefore, the inductors 130 and 131 are configured to have a large reactance value at the frequency corresponding to the power transfer frequency. This large reactance value is connected to the input equivalent resistance of the DC-DC converter 133 in the range of about 10 to 20Ω. As a result, it is inferred that the impedance viewed from the side of the rectifier circuit rCKT to the side of the smoothing circuit 129 becomes high, so that the change in the operating current Idd in the power transfer amplifier SAMP becomes larger than the change in the current in the input equivalent resistance of the DC-DC converter 133.

Namely, it is inferred that, since the impedance on the side of the smoothing circuit 129 is high, it is necessary to largely change the operating current Idd in the power transfer amplifier SAMP in order to generate the same current change as the current change generated in the input equivalent resistance of the DC-DC converter 133 when the inductors 130 and 131 are formed of a signal line (short-circuited), and thus the change in the operating current Idd becomes large. Also, since the operating current Idd in the power transfer amplifier SAMP becomes large, the input current DCIin of the DC-DC converter 133 also becomes large. As a result, the convergence range in which the input voltage DCVin converges in FIG. 2 is narrowed. Also, as shown in FIG. 5, the power transfer amplifier current curves SAI (10), SAI (22), and SAI (51) are not parallel to each other in the direction of the vertical axis (power supply current Idd) of FIG. 5, and have different current change rates. Since the current change rates differ, it is possible to prevent the power transfer amplifier current curves (SAI (10) and SAI (22)) from overlapping with each other as shown in FIG. 4. As a result, the convergence range is narrowed, and convergence to one point is more likely to be achieved.

Next, the case in which the value of the capacitance element 505 in the matching circuit 123 is small will be described. In this case, the inductors 130 and 131 in the smoothing circuit 129 are formed of signal lines (short-circuited). The characteristics in this case are shown in FIG. 6 and FIG. 9. Since the value of the capacitance element 505 connected between the input terminals 501 and 502 in the matching circuit 123 is reduced, the reactance of the capacitance element 505 at the power transfer frequency becomes large. Accordingly, the impedance on the side of the matching circuit 123 viewed from the side of the power receiving coil 121 becomes large, and the power transfer amplifier current curves SAI (10), SAI (22), and SAI (51) shown in FIG. 6 have large change rates (current change rates) and differ in slope from each other as in FIG. 5 in which the inductors 130 and 131 are provided. As a result, the convergence range is narrowed, and convergence to one point is more likely to be achieved as in FIG. 5 described above.

In FIG. 6 and FIG. 9, the value reduced by about 10% from the value of achieving the impedance matching is used as the value of the capacitance element 505 (FIG. 10) in the matching circuit 123. The value of the capacitance element generally varies by about 10% to 20% due to the manufacture. Thus, there is a possibility that the convergence state of the DC-DC converter 133 differs due to the variations in the manufacture of the capacitance element 505. In other words, the convergence state of the DC-DC converter 133 differs depending on the variations in the manufacture.

Therefore, in order to narrow the convergence range of the DC-DC converter 133 by setting the value of the capacitance element 505 of the matching circuit 123, it is desirable that the switching system of the capacitance value described later in a sixth embodiment is adopted or the capacitance value of the capacitance element is determined by actual measurement. In the actual measurement, for example, convergence characteristics of the DC-DC converter 133 are improved by adjusting the circuit constant of the matching circuit 123, particularly the constant of the capacitance element 505 so as to increase the operating current Idd of the power transfer amplifier SAMP when the input equivalent resistance of the DC-DC converter 133 is increased.

However, since it is conceivable that the optimum constant changes depending on the distance between the power transfer coil 113 and the power receiving coil 121 and the state of the load resistance 134, it is desirable to insert the inductors 130 and 131 in the smoothing circuit 129 for the stable operation.

<Noise Reduction>

The contactless power transfer device 1 according to the first embodiment uses an E class switching amplifier as the power transfer amplifier SAMP in order to increase the efficiency. As described with reference to FIG. 1, in the E class switching amplifier, the MOSFET 102 is periodically in an on state and an off state by the drive signal from the drive power supply 101. The noise is generated by the change to the on state and the off state, that is, the switching, and there is a concern that the noise is radiated to the outside from the contactless power transfer device 1 through the power transfer coil 113. The noise radiated to the outside becomes an interference to the other wireless devices. The studies by the inventors have revealed that there is a concern that a ripple voltage is superimposed on the DC voltage output from the rectifier circuit and the ripple voltage also acts as the noise not only in the contactless power transfer device 1 but also in the contactless power receiving device 2.

First, the reduction of noise radiated from the contactless power transfer device 1 will be described. The noise generated when the power transfer amplifier SAMP as a switching amplifier performs the switching operation is transmitted to the power supply line (PLN in FIG. 1) connected to the variable voltage power supply 103 of the power transfer amplifier SAMP. Since the power supply line PLN becomes relatively long due to routing, the power supply line PLN functions as an antenna, and the noise is radiated to the outside of the contactless power transfer device 1. It is conceivable that the conduction noise in which the common mode noise is superimposed on the power supply line PLN is large as the noise to be radiated.

In the contactless power transfer device 1 shown in FIG. 1 according to the first embodiment, the common mode filter 106 is connected between the power supply line PLN and the MOSFET 102. Accordingly, the common mode noise is suppressed by the common mode filter 106, and it is possible to reduce the radiation of the conduction noise.

Also, in the first embodiment, the common mode filter 111 is provided also in the signal line that connects the power transfer coil 113 and the MOSFET 102. Namely, the common mode filter 111 is connected between the MOSFET 102 and the power transfer coil 113. Accordingly, the common mode noise is suppressed by the common mode filter 111, and it is possible to suppress the radiation of the conduction noise from the power transfer coil 113.

Meanwhile, in the contactless power receiving device 2 according to the first embodiment, as shown in FIG. 1, the common mode filter 124 is connected between the matching circuit 123 and the rectifier circuit, and the smoothing circuit 129 is further connected between the rectifier circuit and the DC-DC converter 133. The transmission of the common mode noise from the matching circuit 123 to the rectifier circuit is suppressed by the common mode filter 124. Also, the transmission of the voltage fluctuation (ripple voltage) generated at the rectifier output ends "+" and "−" of the rectifier circuit to the DC-DC converter 133 is suppressed by the inductors 130 and 131 in the smoothing circuit 129. Further, by the smoothing capacitance element 132 in the smoothing circuit 129, the other ends of the inductors 130 and 131 are connected to each other in terms of high frequency.

In addition, the other end of the inductor 131 whose one end is connected to the rectifier output end "−" on the low potential side of the rectifier circuit is connected to the casing ground CVs. Accordingly, the high-frequency noise transmitted through the inductors 130 and 131 is transmitted to the casing ground CVs (ground potential Vs), the transmission of the noise due to ripple voltage and the high-frequency noise to the DC-DC converter 133 is suppressed, and the noise due to ripple voltage and the high-frequency noise in the output voltage of the DC-DC converter 133 can be reduced.

Note that the inductors 130 and 131 function to narrow the convergence range and function to stably operate the DC-DC converter 133 as described above. Also, the inductors 130 and 131 function to reduce the destruction of the devices constituting the rectifier circuit (rectifier diodes).

Figure 13:
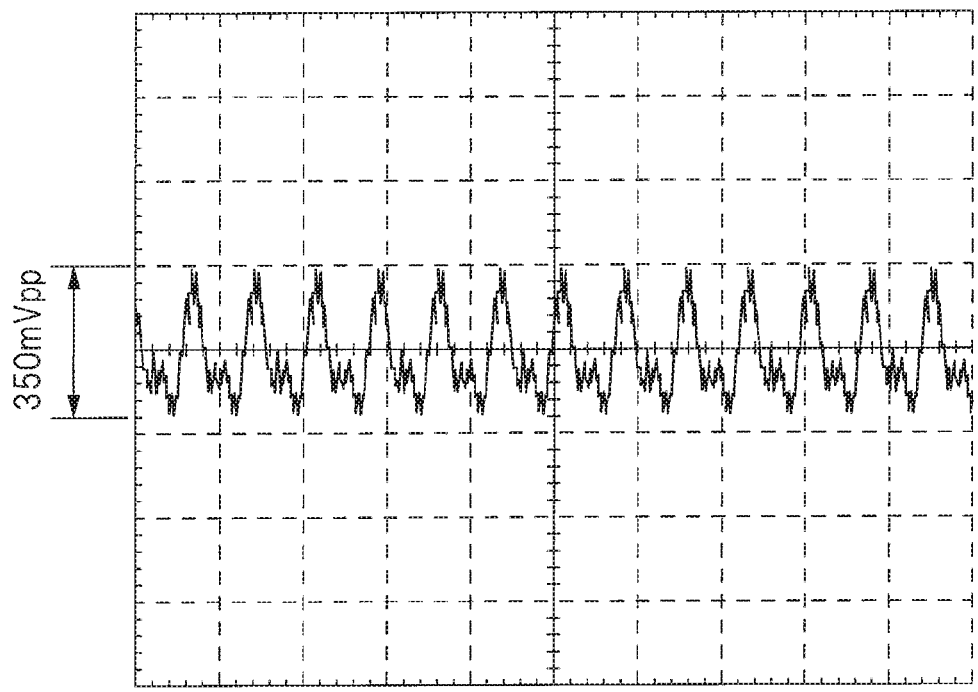
Figure 13:
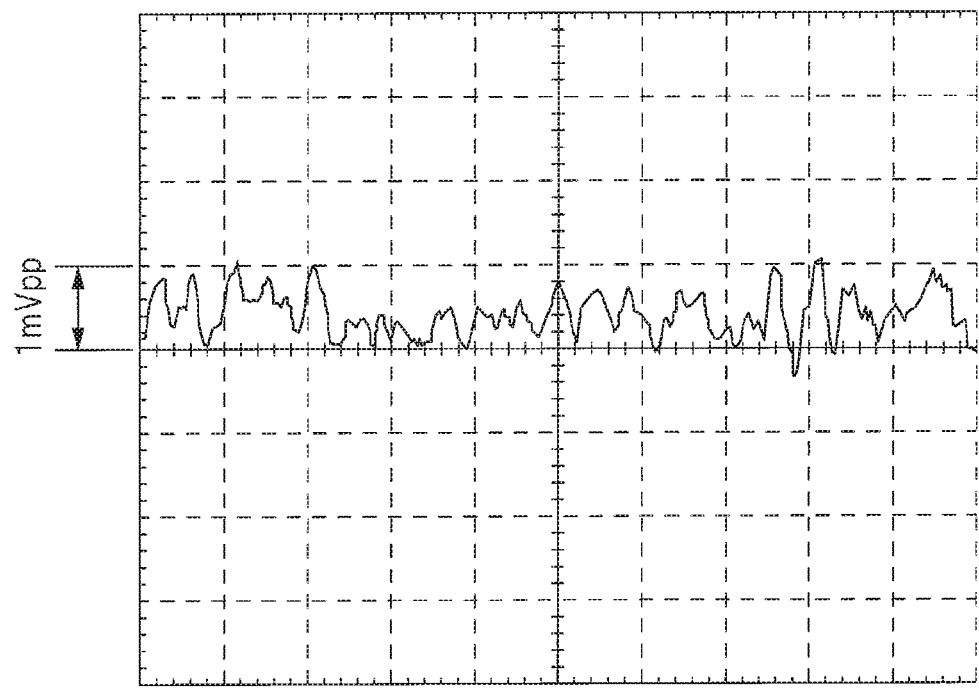

FIG. 13 is waveform charts each showing a result of the measurement of the ripple voltage in the load resistance 134. FIG. 13(A) is a waveform chart showing the waveform of the ripple voltage in the load resistance 134 when power is received from the contactless power transfer device 1 in the state in which the common mode filter 124 and the smoothing circuit 129 are removed from the contactless power receiving device 2 shown in FIG. 1. Also, FIG. 13(B) is a waveform chart showing the waveform of the ripple voltage in the load resistance 134 when power is received in the state in which the common mode filter 124 and the smoothing circuit 129 are provided in the contactless power receiving device 2 as shown in FIG. 1.

In each of FIG. 13(A) and FIG. 13(B), the horizontal axis represents time, and the vertical axis represents voltage. In FIG. 13(A) and FIG. 13(B), the voltage scale of the vertical axis differs so as to easily confirm the waveforms of the ripple voltage. Namely, one unit of the vertical axis (interval between broken lines) indicates 200 mV in FIG. 13(A), and one unit of the vertical axis (interval between broken lines) indicates 1 mV in FIG. 13(B). As shown in FIG. 13(A), when the common mode filter 124 and the smoothing circuit 129 are not provided, the ripple voltage is about 350 mVpp between peaks. On the other hand, in the contactless power receiving device 2 provided with the common mode filter 124 and the smoothing circuit 129, the ripple voltage is greatly reduced to about 1 mVpp between peaks. As can be seen from the comparison between FIG. 13(A) and FIG. 13(B), the effect obtained by adding the inductors 130 and 131 to both ends of the rectifier output in the smoothing circuit 129 and connecting the rectifier output on the low potential side to the casing ground CVs and the improvement effect obtained by inserting the common mode filter 124 are great.

In the first embodiment, by inserting the inductors 130 and 131 in the smoothing circuit 129 and/or setting the value of the capacitance element 505 constituting the matching circuit 123, the current change rate of the operating current Idd of the power transfer amplifier SAMP is made to differ from each other for each input equivalent resistance of the DC-DC converter 133. Accordingly, it is possible to prevent the DC-DC converter 133 from operating in the state of low conversion efficiency and prevent the DC-DC converter 133 from falling into the state of not operating normally by the deterioration of the convergence of the DC-DC converter 133 due to the matching state between the power transfer coil 113 and the power receiving coil 121 and the state of the load of the DC-DC converter 133, and the contactless power transfer and receiving device that operates stably can be provided. In addition, it is possible to suppress the destruction of the devices constituting the rectifier circuit.

Further, by providing the inductors 130 and 131 in the smoothing circuit 129 of the contactless power receiving device 2, it is possible to suppress the transmission of the ripple voltage contained in the rectified output from the rectifier circuit in the contactless power receiving device 2 to the DC-DC converter 133. Also, by providing the smoothing capacitance element 132 that connects the inductors 130 and 131 in the smoothing circuit 129 and connecting the rectifier output on the low potential side to the casing ground CVs, it is possible to reduce the transmission of the high-frequency noise to the DC-DC converter 133. Further, by connecting the common mode filter 124 between the matching circuit 123 and the rectifier circuit in the contactless power receiving device 2, it is possible to reduce the transmission of the common mode noise. Accordingly, it is possible to reduce the ripple voltage in the output from the contactless power receiving device 2, and it is possible to reduce the noise radiated from the contactless power receiving device 2.

Also, by inserting the common mode filter 111 in the signal line of the contactless power transfer device 1, it is possible to suppress the radiation of the switching noise generated from the power transfer amplifier SAMP. Further, by connecting the common mode filter 106 between the power supply line PLN and the MOSFET 102, it is possible to reduce the radiation of the conduction noise.

Since the radiation of the noise can be suppressed in each of the contactless power transfer device 1 and the contactless power receiving device 2 constituting the contactless power transfer and receiving device, it is possible to provide the contactless power transfer and receiving device with low-noise characteristics.

Second Embodiment

FIG. 14 is a circuit diagram showing a configuration of a contactless power transfer and receiving device according to a second embodiment. Since FIG. 14 is similar to FIG. 1, the difference therebetween will be mainly described. Since a configuration of a contactless power transfer device 1-1 is the same as that of the contactless power transfer device 1 shown in FIG. 1, the description thereof will be omitted.

In the contactless power receiving device 2 shown in FIG. 1, the rectifier circuit is composed of a bridge type full-wave rectifier including the rectifier diodes 125 to 128. Also, the smoothing circuit 129 is composed of the two inductors 130 and 131 and the smoothing capacitance element 132. Meanwhile, in a contactless power receiving device 2-1 shown in FIG. 14, the rectifier circuit is composed of a voltage doubler circuit including rectifier diodes 201 and 202. In addition, a smoothing circuit 203 is composed of an inductor 204 and a smoothing capacitance element 205. Here, the inductor 204 is connected between a rectifier output end "+" on the high potential side of the rectifier circuit and the DC-DC converter 133, and the smoothing capacitance element 205 is connected between the inductor 204 and a rectifier output end "−" on the low potential side of the rectifier circuit. Also in this second embodiment, the rectifier output end "−" on the low potential side of the rectifier circuit is connected to the casing ground CVs. Accordingly, as in the first embodiment, the high-frequency signal at the other end of the inductor 204 is connected to the casing earth CVs through the smoothing capacitance element 205 to achieve high-frequency grounding.

Since the operation of the contactless power transfer and receiving device according to the second embodiment is similar to that of the contactless power transfer and receiving device described in the first embodiment, the detailed description thereof will be omitted. However, in the contactless power receiving device 2-1 according to the second embodiment, the DC voltage is formed by the voltage doubler circuit including the two rectifier diodes 201 and 202, and is supplied to the smoothing circuit 203.

The number of inductors of the smoothing circuit 203 is smaller than that of the smoothing circuit 129 described in the first embodiment. However, the inductor 204 in the smoothing circuit 203 functions in the same manner as the inductors 130 and 131 described in the first embodiment. Namely, the inductor 204 functions to make the current change rate of the operating current Idd with respect to the change in the power supply voltage Vdd of the power transfer amplifier SAMP differ for each value of the input equivalent resistance of the DC-DC converter 133. Also, the inductor 203 functions to reduce the ripple voltage in the rectifier circuit composed of the voltage doubler circuit.

In the second embodiment, since the number of devices (rectifier diodes) constituting the rectifier circuit is small and the number of inductors constituting the smoothing circuit 203 is also small, it is possible to provide the contactless power transfer and receiving device with reduced number of components.

Also in this second embodiment, the current change rate of the operating current Idd with respect to the change in the power supply voltage Vdd of the power transfer amplifier SAMP may be made to differ for each value of the input equivalent resistance of the DC-DC converter 133 by adjusting the value of the capacitance element (FIG. 10) in the matching circuit 123 as in the first embodiment. In this case, the inductor 204 may be the signal line (short-circuited) instead of the coil.

Third Embodiment

FIG. 15 is a circuit diagram showing a configuration of a contactless power transfer and receiving device according to a third embodiment. The contactless power transfer and receiving device according to the third embodiment includes a contactless power transfer device 1-2 and a contactless power receiving device 2-2. Since the contactless power transfer device 1-2 and the contactless power receiving device 2-2 are similar to the contactless power transfer device 1 and the contactless power receiving device 2 shown in FIG. 1, the difference therebetween will be mainly described.

First, the contactless power transfer device 1-2 will be described. As in the contactless power transfer device 1 shown in FIG. 1, the contactless power transfer device 1-2 includes the power transfer amplifier SAMP, the common mode filter 111, the resonant capacitance element 112, and the power transfer coil 113. Also, a modulation demodulation circuit (second modulation demodulation circuit) 311, a control circuit 312, and a display device 313 are added in the contactless power transfer device 1-2 with respect to the contactless power transfer device 1. Since the common mode filter 111, the resonant capacitance element 112, and the power transfer coil 113 are the same as those of the contactless power transfer device 1, the description thereof will be omitted.

The power transfer amplifier SAMP includes MOSFETs 303 and 304 whose gates are connected to drive signal input terminals 301 and 302, diodes 305 and 306 connected between the drains and sources of the MOSFETs 303 and 304, a capacitance element 307, the common mode filter 106, the variable voltage power supply 103, and a filter 308. Drive signals are supplied to the drive signal input terminals 301 and 302 from a drive power supply (not shown). In the third embodiment, drive signals of opposite phases to each other are supplied to the drive signal input terminals 301 and 302 from the drive power supply. The drive signal is a signal whose voltage periodically changes, and the frequency thereof is the power transfer frequency.

Accordingly, the MOSFETs 303 and 304 are alternately turned on and off, and the on-off period is determined by the power transfer frequency. The drain of the MOSFET 303 is connected to the variable voltage power supply 103 through the common mode filter 106. Also, the source of the MOSFET 303 and the drain of the MOSFET 304 are connected, and the source of the MOSFET 304 is connected to the ground potential Vs through the common mode filter 106. In addition, the capacitance element 307 is connected between the drain of the MOSFET 303 and the source of the MOSFET 304. For example, the capacitance element 307 functions to suppress the high-frequency signal generated by periodically turning on and off the MOSFETs 303 and 304 from being transmitted to the common mode filter 106.

By periodically and alternately turning on and off the MOSFETs 303 and 304, voltage at a connection node between the source of the MOSFET 303 and the drain of the MOSFET 304 periodically changes according to the power transfer frequency. The voltage that changes periodically is supplied to the common mode filter 111 through the filter 308, and is further supplied to the series resonant circuit composed of the resonant capacitance element 112 and the power transfer coil 113, so that the power is transferred.

The power transfer amplifier SAMP according to the third embodiment is an inverter circuit referred to as a half bridge circuit, and is used for the case of a relatively low power transfer frequency such as several tens KHz to several hundreds KHz as compared with the E class amplifier described with reference to FIG. 1. As in the filter 110 in the first embodiment, the filter 308 achieves the impedance matching and suppresses the transmission of the harmonic signal generated in the inverter circuit constituting the power transfer amplifier SAMP. For example, the filter 308 is composed of a L-shaped low pass filter.

An input and an output of the modulation demodulation circuit 311 are connected to a latter stage of the common mode filter, that is, a connecting portion between the common mode filter 111 and the series resonant circuit. The control circuit 312 controls the power transfer performed by the contactless power transfer device 1-2, and controls the modulation demodulation circuit 311 and the display device 313. The modulation demodulation circuit 311 performs the amplitude modulation on the transferred power output from the power transfer coil 113 based on information to be transmitted. As a result, the information is transmitted from the contactless power transfer device 1-2 to the contactless power receiving device 2-2. In other words, the modulation demodulation circuit 311 is a circuit that performs the modulation and demodulation on the transferred power and is an amplitude modulation circuit that performs the modulation with amplitude.

Next, the contactless power receiving device 2-2 will be described. A smoothing capacitance element (second smoothing capacitance element) 331, a modulation demodulation circuit (first modulation demodulation circuit) 321, a control circuit 322, and a display device 323 are added in the contactless power receiving device 2-2 with respect to the contactless power receiving device 2 described with reference to FIG. 1.

The smoothing capacitance element 331 is provided in the smoothing circuit 129 and is connected between the rectifier output end "+" on the high potential side and the rectifier output end "−" on the low potential side of the rectifier circuit. The value of the smoothing capacitance element 331 is set so as to have the impedance lower than the power receiving impedance of the power receiving coil 121 in the harmonics of the power received by the power receiving coil 121. Accordingly, when the rectified output from the rectifier circuit contains the harmonics, the smoothing capacitance element 331 functions to short-circuit between the rectifier output end "+" on the high potential side and the rectifier output end "−" on the low potential side for the harmonics, so that the transmission of the harmonics from the smoothing circuit 129 to the DC-DC converter 133 is suppressed.

The input and output of the modulation demodulation circuit 321 are connected to a former stage of the common mode filter 124, that is, the connecting portion between the matching circuit 123 and the common mode filter 124. The control circuit 322 controls the power receiving performed by the contactless power receiving device 2-2, and controls the modulation demodulation circuit 321 and the display device 323. The modulation demodulation circuit 321 performs the communication by load modulation using reflected waves generated by changing the impedance of the received power under the control of the control circuit 322. In other words, the modulation demodulation circuit 321 is a circuit that performs modulation and demodulation to the received power, and is a load modulation circuit that performs modulation by load modulation.

Namely, the communication is performed from the contactless power transfer device 1-2 to the contactless power receiving device 2-2 by changing the amplitude, and the communication is performed from the contactless power receiving device 2-2 to the contactless power transfer device 1-2 by changing the impedance.

The display devices 313 and 323 notify the error when the DC-DC converter 133 is operating in a state of low conversion efficiency and when the DC-DC converter 133 is not operating normally. For example, the control circuit 312 notifies the state and error of the DC-DC converter 133 by demodulating the communication from the contactless power receiving device 2-2 by the modulation demodulation circuit 311. At this time, the display device 323 may also display the state, the error, and the like of the DC-DC converter 133, or may display the information of the communication from the contactless power transfer device 1-2. Similarly, the display device 313 may display the state of the contactless power transfer device 1-2.

Also in this third embodiment, the effect similar to that of the first embodiment can be obtained. In addition, the modulation demodulation circuit 311 is connected to a latter stage of the common mode filter 111 in the contactless power transfer device 1-2, and the modulation demodulation circuit 321 is connected to a former stage of the common mode filter 124 in the contactless power receiving device 2-2. Accordingly, it is possible to perform the communication between the contactless power transfer device 1-2 and the contactless power receiving device 2-2 without influences from the common mode filters 111 and 124. Therefore, it is possible to provide the contactless power transfer and receiving device capable of controlling the transferred power in the wireless power transfer technology by the communication using the transferred power (power transfer signal) in the wireless power transfer technology.

Fourth Embodiment

FIG. 16 is a circuit diagram showing a configuration of a contactless power transfer and receiving device according to a fourth embodiment. The contactless power transfer and receiving device according to the fourth embodiment includes a contactless power transfer device 1-3 and a contactless power receiving device 2-3.

The contactless power transfer device 1-3 includes the power transfer amplifier SAMP, the common mode filter 111, and the series resonant circuit composed of the resonant capacitance element 111 and the power transfer coil 113. Further, the contactless power transfer device 1-3 includes a communication circuit 421, an antenna 422, a control circuit 423, and a display device 424. The power transfer amplifier SAMP includes MOSFETs 403 and 404 (first MOSFET, second MOSFET) whose gates are connected to drive signal input terminals 401 and 402, resonant capacitance elements 405 and 406 connected between sources and drains of the MOSFETs 403 and 404, the choke coil 105, the common mode filter 106, the variable voltage power supply 103, the ground capacitance element 104, a transformer 408 having an intermediate tap, and a filter 409.

The sources of the MOSFETs 403 and 404 are commonly connected, and the common source is connected to the ground potential Vs through the common mode filter 106. The drains of the MOSFETs 403 and 404 are connected to an end of the coil having the intermediate tap of the transformer 408, and the intermediate tap of the coil is connected to the common mode filter 106 through the choke coil 105.

The drive signal input terminals 401 and 402 are connected to the drive power supply (not shown), and drive signals of opposite phases to each other are supplied to the drive signal input terminals 401 and 402 from the drive power supply. As described in the third embodiment, the drive signal is a signal of the power transfer frequency. The power transfer amplifier SAMP according to the fourth embodiment is a so-called push-pull operating (push-pull type) E class amplifier. The MOSFETs 403 and 404 are alternately turned on and off at a predetermined cycle by the drive signals supplied to the drive signal input terminals 401 and 402. For example, when the MOSFET 403 is turned on, a parallel resonant circuit is composed of the resonant capacitance element 406 connected in parallel between the source and the drain of the MOSFET 404 and the coil having the intermediate tap of the transformer 408. On the other hand, when the MOSFET 404 is turned on, a parallel resonant circuit is composed of the resonant capacitance element 405 connected in parallel between the source and the drain of the MOSFET 403 and the coil (having the intermediate tap) of the transformer 408.

The output of the parallel resonant circuit is transmitted to the coil in the transformer 408 to which the filter 409 is connected, and is supplied to the series resonant circuit through the filter 409 and the common mode filter 111, so that the power is transferred.

Since the series resonant circuit including the choke coil 105, the common mode filters 106 and 111, the variable voltage power supply 103, the ground capacitance element 104, and the power transfer coil 113 has been described in the first embodiment, the description thereof will be omitted.

A communication circuit 431, an antenna 432, a control circuit 433, and a display device 443 are added in the contactless power receiving device 2-3 with respect to the contactless power receiving device 2.

In the third embodiment, the case in which the communication between the contactless power transfer device and the contactless power receiving device is performed by using the power transfer coil 113 and the power receiving coil 121 has been described. Meanwhile, in the fourth embodiment, the communication between the contactless power transfer device 1-3 and the contactless power receiving device 2-3 is performed by using the communication circuits 421 and 431 and the antennas 422 and 432. The control circuit 423 controls the power transfer performed by the contactless power transfer device 1-3, and controls the communication circuit 421 and the display device 424. Similarly, the control circuit 433 controls the power receiving performed by the contactless power receiving device 2-3, and controls the communication circuit 431 and the display device 434.

For example, when the DC-DC converter 133 is operating in a state of low conversion efficiency or when the DC-DC converter 133 is not operating normally, the control circuit 433 grasps it and transmits the grasped information wirelessly from the antenna 432 through the communication circuit 431. In the contactless power transfer device 1-3, the information transmitted wirelessly is received by the antenna 422 and the communication circuit 421 and is displayed on the display device 424. Similarly, the control circuit 423 may grasp the state of the contactless power transfer device 1-3, and the information may be transmitted wirelessly by using the communication circuit 421 and the antenna 422. In this case, the information transmitted wirelessly is received by the communication circuit 431 and the antenna 432 in the contactless power receiving device 2-3 and is displayed on the display device 434. Of course, the display device 434 may display the state of the contactless power receiving device 2-3, and the display device 424 may display the state of the contactless power transfer device 1-3.

Also in this fourth embodiment, the effect similar to that described in the third embodiment can be obtained. In addition, in the fourth embodiment, by the push-pull operation of the power transfer amplifier SAMP, breakdown voltage of the MOSFETs 403 and 404 is relatively low and even a device having a low on-resistance can be used, so that the contactless power transfer and receiving device excellent in conversion efficiency can be obtained.

Fifth Embodiment

FIG. 10 is a circuit diagram showing a configuration of the matching circuit 123 according to a fifth embodiment. The matching circuit 123 described in the fifth embodiment is used in the contactless power receiving device described in the other embodiments. Here, the configuration of the matching circuit 123 and design means of impedance matching will be described.

FIG. 10(A) is a circuit diagram showing a configuration of a matching circuit, and FIG. 10(B) is a circuit diagram showing an equivalent circuit of the matching circuit. Also, FIG. 10(C) is a diagram showing calculation expressions.

In FIG. 10(A), 501 and 502 denote input terminals of the matching circuit 123, and 503 and 504 denote output terminals of the matching circuit 123. The matching circuit 123 includes the inductor 506 connected between the input terminal 501 and the output terminal 503, the inductor 507 connected between the input terminal 502 and the output terminal 504, and the capacitance element 505 connected between the input terminals 501 and 502.

When described with reference to FIG. 1, the input terminal 501 is connected to the intermediate tap of the power receiving coil 121, and the input terminal 502 is connected to the tap at an end of the power receiving coil. Also, the output terminals 503 and 504 are connected to the rectifier circuit composed of the rectifier diodes 125 to 128 through the common mode filter 124.

Assuming that a resistance value on the side of the input terminals 501 and 502 of the rectifier circuit 123 is defined as R1 and a resistance value on the side of the common mode filter 124 to be a latter stage is defined as R2, values of the inductors 506 and 507 and the capacitance element 505 for achieving the impedance matching are the values calculated by the expressions (1) to (3) shown in FIG. 10(C).

The expressions (1) to (3) correspond to a calculation method referred to as the L-match circuit. The matching circuit 123 shown in FIG. 10(A) can be represented by the equivalent circuit having a differential configuration shown in FIG. 10(B). By providing an imaginary intermediate potential point CP (broken line in FIG. 10(B)), the matching circuit 123 can be divided into two configurations and designed with the differential configuration.

An example of the design of the matching circuit 123 will be described as follows. Assuming that the resistance value R1 on the side of the input terminal of the matching circuit 123 is 350Ω, the resistance value R2 on the side of the output terminal is 20Ω, and the power transfer frequency f is 6.78 MHz, the value Q is 4.06, the value (inductance) L of the inductors 506 and 507 is 0.95 uH, and the value (capacitance) C of the capacitance element 505 is 275 pF. These values correspond to those described with reference to FIG. 4 to FIG. 9.

By achieving the impedance matching in this manner, the matching loss can be reduced, and the contactless power transfer and receiving device with small loss can be provided. From the viewpoint of achieving the impedance matching, the capacitance element 505 can be regarded as a matching capacitance element, and the inductors (third inductor) 506 and 507 can be regarded as matching inductors.

Further, the value of the matching capacitance element 505 is changed by experiments or the like. Namely, the value of the capacitance element 505 is set by experiments to the value with which the operation of the DC-DC converter 133 is stabilized as described in the first embodiment. In other words, the characteristics of the matching circuit 123 are set by experiments so that the change rate of the operating current Idd of the power transfer amplifier SAMP with respect to the change in the power supply voltage Vdd of the power transfer amplifier SAMP differs depending on the input equivalent resistance (input equivalent resistance of DC-DC converter 133) connected to the rectifier circuit.

Of course, the operation of the DC-DC converter 133 may be stabilized by changing the values of the inductors 130 and 131 in the smoothing circuit 129, and the operation of the DC-DC converter 133 may be stabilized by using them in combination.

Sixth Embodiment

FIG. 17 is a circuit diagram showing a configuration of a contactless power receiving device 2-4 according to a sixth embodiment. Since FIG. 17 is similar to the contactless power receiving device 2-3 shown in FIG. 16, the difference therebetween will be mainly described here. The contactless power receiving device 2-4 shown in FIG. 17 differs from FIG. 16 in the matching circuit 123 and the control circuit 433.

In FIG. 17, the matching circuit 123 has a configuration to selectively connect a capacitance element to the capacitance element 505 by a switching signal CC from the control circuit 433 in addition to the inductors 506 and 507 and the capacitance element 505 described with reference to FIG. 10. Namely, the system of switching the capacitance value is adopted in the matching circuit 123.

The matching circuit 123 includes capacitance elements 505, 601, and 602, a source resistance 605, gate resistances 606 and 607, the inductors 506 and 507, and MOSFETs 603 and 604. Since the connection of the capacitance element 505 and the inductors 506 and 507 is the same as that in FIG. 10, the description thereof will be omitted.

Sources of the MOSFETs 603 and 604 are commonly connected, and the common source is connected to the ground potential Vs through the source resistance 605. Also, the switching signal CC is supplied from the control circuit 433 to gates of the MOSFETs 603 and 604 through the gate resistances 606 and 607. A drain of the MOSFET 603 is connected to one end (input terminal 501 in FIG. 10) of the capacitance element 505 through the capacitance element 601, and a drain of the MOSFET 604 is connected to the other end (input terminal 502 in FIG. 10) of the capacitance element 505 through the capacitance element 602.

When the switching signal CC from the control circuit 433 is at a high level, the MOSFETs 603 and 604 are in an on state, and thus the capacitance elements 601 and 602 are connected in series and the capacitance elements 601 and 602 connected in series are connected in parallel to the capacitance element 505. Accordingly, the value of the capacitance element constituting the matching circuit 123 can be changed. Note that the source resistance 605 is configured to supply a voltage to the source in order to turn on the MOSFETs 603 and 604, and has a sufficiently large resistance value.

In the sixth embodiment, the control circuit 433 sets the switching signal CC to the high level or the low level when the operation of the DC-DC converter 133 is not normal due to the variations of the capacitance elements in mass production, the coupling state between the power transfer coil and the power receiving coil 121, and the load state of the DC-DC converter 133. Accordingly, it is possible to obtain the contactless power transfer and receiving device capable of making the DC-DC converter 133 operate normally by changing the capacitance value of the capacitance elements constituting the matching circuit 123.

In this sixth embodiment, the MOSFETs 603 and 604, the capacitance elements 601 and 602, the source resistance 605, and the gate resistances 606 and 607 can be regarded as constituting an adjustment circuit for adjusting the capacitance value of the matching capacitance element provided in the matching circuit 123. In this case, the capacitance elements 601 and 602 can be regarded as adjustment capacitance elements. Also, the adjustment circuit is connected in parallel to the matching capacitance element 505, and the MOSFETs 603 and 604 in the adjustment circuit selectively connect the adjustment capacitance elements 601 and 602 to the matching capacitance element 505 according to the switching signal CC, whereby the capacitance value of the matching capacitance element provided in the matching circuit 123 is adjusted.

<Capacitance Value Switching Operation of Capacitance Element Constituting Matching Circuit>

Next, an example of an operation of switching a capacitance value of a capacitance element constituting the matching circuit 123 will be described. Here, the case in which the contactless power transfer and receiving device includes the contactless power transfer device 1-3 shown in FIG. 16 and the contactless power receiving device 2-4 shown in FIG. 17 will be described. Also, the case in which a malfunction occurs in the operation of the DC-DC converter 133 when a mobile device is charged by the contactless power transfer and receiving device will be described as an example.

FIG. 18 and FIG. 19 are flowcharts each showing an operation of the contactless power transfer and receiving device according to the sixth embodiment. Hereinafter, the operation will be described with reference to FIG. 16 to FIG. 19.

In step S11 of FIG. 18, the power supply of the contactless power transfer device 1-3 is turned on, and the contactless power transfer device 1-3 starts to operate. In step S12, the control circuit 423 starts power transfer at such a weak level that the communication circuit 431 provided in the contactless power receiving device 2-4 is turned on (transfer to front side coil with small power).

Next, in step S13 (start communication when a device to be charged is placed on a coil) and step S14 (communicate with a communication device on a power transfer side, and determine whether the device is a target device?), it is determined whether a mobile device is placed on a charging stand and the communication from the contactless power receiving device 2-4 is received by the contactless power transfer device 1-3, and it is recognized whether the mobile device placed on the charging stand is a target device.

When the device is recognized as a target mobile device in step S14, the contactless power transfer device 1-3 starts the power transfer for charging in step S15 (start power transfer). On the other hand, when the device is not recognized as a target mobile device in step S14, the contactless power transfer device 1-3 displays alert on the display device 424 or the like and stops power transfer in step S16 (stop power transfer and display alert).

When the power transfer is started in step S15, the control circuit 433 in the contactless power receiving device 2-4 acquires the values of received voltage and current and wirelessly transmits them by the communication circuit 431 in step S17 (transmit values of received rectified voltage and current). In step S18, the contactless power transfer device 1-3 receives the voltage value and the current value transmitted wirelessly in step S17 and determines whether the received voltage value and current value are appropriate with respect to the power supply voltage Vdd and the operating current Idd of the power transfer amplifier SAMP (whether received voltage and current are appropriate with respect to voltage and current of amplifier?).

When determined to be inappropriate in step S18, the contactless power transfer device 1-3 displays alert on the display device 424 and stops power transfer in step S19 (stop power transfer and display alert). Note that, when it is determined that the DC-DC converter 133 performs charging in the state of slightly low efficiency in step S18, the contactless power transfer device 1-3 may notify the low efficiency state by the display device 424 and may perform the power transfer after the operation of encouraging to adjust the way of placing the mobile device.

When determined to be appropriate in step S18, the contactless power transfer device 1-3 determines whether the charging is finished in step S20, and when the charging is not finished, it repeats steps S17, S18, and S20 until the charging is completed. When the load changes due to the charging state while the contactless power transfer device 1-3 is repeating steps S17, S18, and S20, the control circuit 423 sets the power supply voltage Vdd corresponding to the charging state to the power transfer amplifier SAMP in step S21 (set power transfer voltage corresponding to charging state). Also, when it is determined that the charging is finished in step S20, the contactless power transfer device 1-3 stops power transfer to finish the charging in step S22 (stop power transfer and finish charging).

As described above, the malfunction of the operation of the DC-DC converter 133 or the like is determined in the contactless power transfer device 1-3 during the charging.

The example in which the malfunction is determined in the contactless power transfer device 1-3 has been described, but the malfunction may be determined in the contactless power receiving device 2-4. FIG. 19 shows the case in which the malfunction is determined in the contactless power receiving device 2-4. Since the steps in FIG. 19 are the same as those in FIG. 18 from steps S11 to S15, the above-described steps S11 to S14 are omitted and step S15 and subsequent steps are shown in FIG. 19.

When the contactless power transfer device 1-3 starts power transfer in step S15, the contactless power transfer device 1-3 acquires the power supply voltage Vdd and the operating current Idd of the power transfer amplifier SAMP and wirelessly transmits them by the communication circuit 421 in step S23 (transmit voltage and current values of power transfer amplifier to mobile device). Also, the control circuit 433 in the contactless power receiving device 2-4 measures the received voltage and current in step S23 (measure received voltage and current values).

The control circuit 433 in the contactless power receiving device 2-4 changes the voltage of the switching signal CC in step S24. Accordingly, the capacitance value of the capacitance element constituting the matching circuit 123 is changed. After the capacitance value is changed, the control circuit 433 measures the received voltage and current values again (switch capacitance value of power receiving matching circuit and measure received voltage and current values). In step S25 after step S24, the control circuit 433 requests the contactless power transfer device 1-3 to acquire the power supply voltage Vdd and the operating current Idd of the power transfer amplifier SAMP and transmit them by the communication circuit 431 (request power transfer side to transmit voltage and current values of power transfer amplifier).

In step S26, the control circuit 433 determines whether the received power obtained from the received voltage and current before changing the capacitance value of the capacitance element constituting the matching circuit 123 is larger than the received power obtained from the received voltage and current after changing the capacitance value (whether received power is larger before changing capacitance value?). When the received power is smaller before changing the capacitance value in step S26, the control circuit 433 maintains the voltage of the switching circuit CC changed in step S24 and then executes step S28. Meanwhile, when the received power is larger before changing the capacitance value, step S27 is executed. In step S27, the control circuit 433 returns the switching signal CC to the voltage before the change in step S24. Accordingly, in step S27, the capacitance value of the capacitance element constituting the matching circuit 123 is changed to the value before the change in step S24 (change capacitance value to value before change). After step S24, step S28 is executed.

In step S28, the control circuit 433 determines whether the received voltage and current are appropriate with respect to the power supply voltage Vdd and the operating current Idd of the power transfer amplifier SAMP received in step S23 or the power supply voltage Vdd and the operating current Idd of the power transfer amplifier SAMP received from the contactless power transfer device 1-3 by the request in step S25 (whether received voltage and current are appropriate with respect to voltage and current of amplifier?). When determined to be inappropriate in step S28, the control circuit 433 displays alert on the display device 434 in step S29. Also, the control circuit 433 requests the contactless power transfer device 1-3 to stop power transfer (stop power transfer and display alert). Also in step S29, when it is determined that the DC-DC converter 133 performs charging in the state of slightly low efficiency, the control circuit 433 may notify the low efficiency state by the display device 434 and may request the power transfer after the operation of encouraging to adjust the way of placing the mobile device as in the above-described step S19.

Meanwhile, when determined to be appropriate in step S28, it is determined whether the charging is finished in step S30 (whether charging is finished?). When it is determined that charging is not finished in step S30, steps S23 to S30 are repeated.

When the load changes due to the charging state while repeating steps S23 to S30, the control circuit 433 requests to set the power supply voltage Vdd corresponding to the charging state to the power transfer amplifier SAMP in step S31 (set power transfer voltage corresponding to charging state). Also, when it is determined that the charging is finished in step S30, the control circuit 433 requests the contactless power transfer device 1-3 to stop power transfer and finish the charging (stop power transfer and finish charging).

As described above, when a malfunction occurs in the operation of the DC-DC converter 133, it is possible to notify the malfunction by the display device 424 and/or the display device 434. Further, according to the flowchart shown in FIG. 19, it is possible to set the more appropriate capacitance value of the matching circuit 123.

Seventh Embodiment

Figure 20:
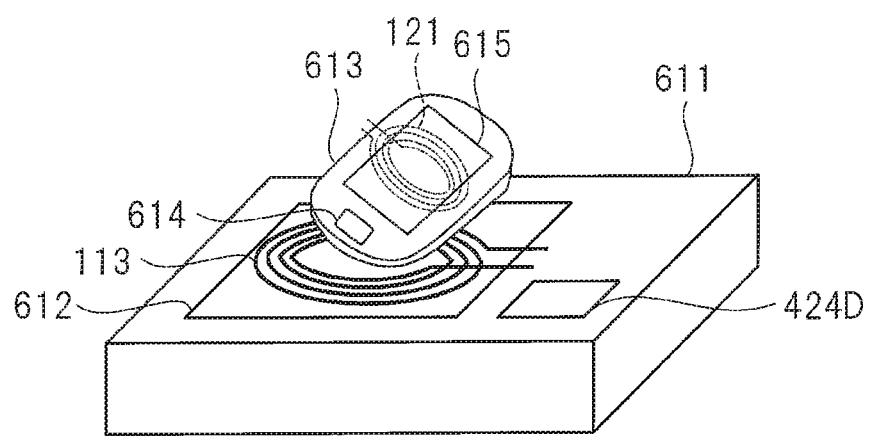
Figure 20:
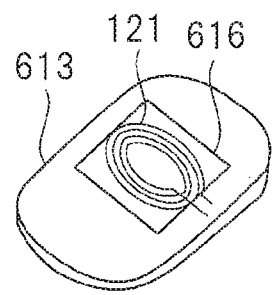

FIG. 20 is a schematic external view showing a configuration of a contactless power transfer and receiving device according to a seventh embodiment. Here, a configuration in which a mobile device is placed on a charging stand to charge a battery built in the mobile device will be described as an example. In this case, the contactless power receiving device described in the first to sixth embodiments are mounted in the mobile device, and the contactless power transfer device is mounted in the charging stand.

FIG. 20(A) is an external view showing the configuration of the charging stand in which the contactless power transfer device is mounted and the mobile device in which the contactless power receiving device is mounted, and FIG. 20(B) is an external view showing the configuration of the mobile device in which the contactless power receiving device is mounted.

In FIG. 20(A), 611 denotes the charging stand. In the casing of the charging stand 611, the elements of the contactless power transfer device except the power transfer coil 113 are incorporated. When described with taking the contactless power transfer device 1-3 described in the fourth embodiment as an example, the power transfer amplifier SAMP, the common mode filter 111, the resonant capacitance element 112, the communication circuit 421, the antenna 422, the control circuit 423, and the display device 424 shown in FIG. 16 are incorporated in the casing of the charging stand 611. A magnetic sheet 612 is provided on an upper surface of the charging stand 611, and the power transfer coil 113 is mounted on an upper side of the magnetic sheet 612. This power transfer coil 113 is connected to the resonant capacitance element 112 and others incorporated in the casing of the charging stand 612. In addition, in FIG. 20(A), 424D denotes a display screen of the display device 424, and the display screen 424D of the display device 424 protrudes on the upper surface of the charging stand 612 so that a user can confirm the display contents.

In FIG. 20(A), 613 denotes a terminal device. A casing of the terminal device 613 has a main surface and a back surface. Though not particularly limited, elements of the contactless power receiving device except the power receiving coil 121 are incorporated in the casing of the mobile device 613. When described with taking the contactless power receiving device 2-3 shown in FIG. 16 as an example, the resonant capacitance element 122, the matching circuit 123, the common mode filter 124, the rectifier circuit, the smoothing circuit 129, the DC-DC converter 133, the communication circuit 431, the antenna 432, the control circuit 433, and the display device 434 are incorporated in the casing of the mobile device 613. In addition, in the casing of the mobile device 613, a desired circuit (for example, CKT in FIG. 11) for achieving the function of the mobile device 613 and a battery (VBC in FIG. 11) are incorporated as a load (corresponding to the load resistance 134) of the contactless power receiving device 2-3.

FIG. 20(A) shows the main surface of the mobile device 613. Though not particularly limited, a display screen 615 and an operation button 614 are disposed on the main surface of the mobile device 613. In addition, the power receiving coil 121 is formed on the back surface of the mobile device 613. The power receiving coil 121 is connected to the resonant capacitance element 122 and others incorporated in the casing of the mobile device 613. Note that the power receiving coil 121 is formed on the back side, and is thus indicated by broken lines in FIG. 20(A).

FIG. 20(B) is an external view showing a configuration of the back surface of the mobile device 613. A magnetic sheet 616 is provided on the back surface of the mobile device 613, and the above-mentioned power receiving coil 121 is mounted on an upper side of the magnetic sheet 616. Though not particularly limited, the display device 434 commonly uses the display screen 615 on the main surface of the mobile device 613 as the display screen thereof.

In FIG. 20, the charging stand 611 includes the contactless power transfer device 1-3 described in the fourth embodiment, and the mobile device 613 includes the contactless power receiving device 2-3. Therefore, when a malfunction occurs in the operation of the DC-DC converter 133 due to the way of placing the mobile device 613 on the charging stand 611, the error is notified on the display screen 424D by the display device 313. This error notification can encourage the user to check the way of placing the mobile device 613 again, so that it is possible to prevent the mobile device from being kept charged in the state of the occurrence of malfunction.

<Modification>

FIG. 21 is a schematic external view showing a configuration of a contactless power transfer and receiving device according to a modification of the seventh embodiment. Here, a case in which a plurality of mobile devices are simultaneously charged by one charging stand will be described.

FIG. 21 shows the configuration in which two mobile devices are simultaneously charged as an example of a plurality of devices. In FIG. 21, 613 denotes a first mobile device and the mobile device 613 has the configuration described with reference to FIG. 20. Also, 613n denotes a second mobile device, and the mobile device 613n has the same configuration as that of the mobile device 613 though not particularly limited. In FIG. 21, a symbol "n" is assigned to a numerical symbol for the components of the mobile device 613n which are the same as those of the mobile device 613. For example, the symbol "n" is assigned to the power receiving coil 121 of the mobile device 613n corresponding to the power receiving coil 121 in the mobile device 613, and the power receiving coil of the mobile device 613n is denoted as 121n.

In FIG. 21, the charging stand 611 includes the power transfer coil 113 mounted on the upper side of the magnetic sheet 612 and the display screen 424D as in FIG. 20. In addition, as described with reference to FIG. 20, the elements of the contactless power transfer device except the power transfer coil 113 are incorporated in the casing of the charging stand 611, and the power transfer coil 113 is connected to the elements of the contactless power transfer device incorporated in the casing of the charging stand 611. Also in this case, the contactless power transfer device mounted in the charging stand 611 has the configuration of the contactless power transfer device 1-3 described in the fourth embodiment. In addition, the contactless power receiving device 2-3 described in the fourth embodiment is mounted in each of the first and second mobile devices 613 and 613n.

In the case in which the two mobile devices 613 and 613n are simultaneously charged, for example, if the DC-DC converter 133 in the first mobile device 613 is operating in a state of low efficiency, it is conceivable that the power to be transferred from the contactless power transfer device 1-3 to the second mobile device 613n is lowered and becomes insufficient. For this reason, even in the charging stand 611 having specifications capable of simultaneously charging a plurality of mobile devices, the number of mobile devices that are actually charged simultaneously is smaller than the number determined by the specifications, and a situation in which only a smaller number of mobile devices are charged occurs.

In the contactless power transfer device 1-3 described in the fourth embodiment, when the DC-DC converter 133 is operating in the state of low efficiency, the error can be notified by the display screen 424D. By this notification, the user adjusts the way of placing the mobile device whose DC-DC converter 133 is operating in the state of low efficiency, so that a plurality of mobile devices corresponding to the number of mobile devices determined by specifications can be charged simultaneously.

Eighth Embodiment

FIG. 22 is a circuit diagram showing a configuration of a contactless power transfer and receiving device according to an eighth embodiment. In the eighth embodiment, the contactless power transfer and receiving device is used to charge a battery in an electric vehicle. Namely, the contactless power receiving device is mounted in an electric vehicle, and the contactless power transfer device is installed in a charging station including home. The contactless power transfer device according to the eighth embodiment is similar to the contactless power transfer devices 1-2 and 1-3 described in the third and fourth embodiments, and the contactless power receiving device is also similar to the contactless power receiving devices 2-2 and 2-3 described in the third and fourth embodiments.

First, the contactless power transfer device installed in the charging station will be described. In FIG. 22, 1-4 denotes the contactless power transfer device installed in the charging station. Since the contactless power transfer device 1-4 is similar to the contactless power transfer device 1-3, the difference therebetween will be mainly described. Since the common mode filter 111, the resonant capacitance element 112, the power transfer coil 113, the communication device 421, the antenna 422, the control circuit 423, and the display device 424 shown in FIG. 22 are the same as those of the contactless power transfer device 1-3 shown in FIG. 16, the description thereof will be omitted.

The power transfer amplifier SAMP includes drive signal input terminals 701, 702, 701', and 702', MOSFETs 703 to 706, diodes 707 to 710, the common mode filter 106, the variable voltage power supply 103, the capacitance element 307, and the filter 308. Here, since the common mode filter 106, the variable voltage power supply 103, and the capacitance element 307 are the same as those of the third embodiment described with reference to FIG. 15, the description thereof will be omitted.

Gates of the MOSFETs 703 to 706 are connected to the corresponding drive signal input terminals 701, 702, 701', and 702'. Also, the diodes 707 to 710 are connected in parallel between sources and drains of the MOSFETs 703 to 706. The drain of the MOSFET 704 is connected to the source of the MOSFET 703, and a first output signal is supplied from this connection node to the filter 308. Also, the drain of the MOSFET 706 is connected to the source of the MOSFET 705, and a second output signal is supplied from this connection node to the filter 308. The drains of the MOSFETs 703 and 705 are connected to the variable voltage power supply 103 through the coil of the common mode filter 106, and the sources of the MOSFETs 704 and 706 are connected to the ground potential Vs through the coil of the common mode filter 107.

The drive signal input terminals 701, 702, 701', and 702' are connected to a drive power supply (not shown). The drive power supply supplies a common mode first drive signal whose voltage periodically changes to the drive signal input terminals 701 and 701', and supplies a common mode second drive signal whose voltage periodically changes to the drive signal input terminals 702 and 702'. Here, the first drive signal and the second drive signal are signals whose phases are reversed from each other. The first drive signal and the second drive signal are supplied to the gates of the MOSFETs 703 to 706, whereby the MOSFETs 703 and 706 and the MOSFETs 704 and 705 are complementarily turned on and off. Namely, when the MOSFETs 703 and 706 are in an on state (or off state), the MOSFETs 704 and 705 are in an off state (or on state).

The first output signal and the second output signal formed by complementarily turning on and off the MOSFETs 703 and 706 and the MOSFETs 704 and 705 are supplied through the filter 308 and the common mode filter 111 to a series resonant circuit composed of the resonant capacitance element 112 and the power transfer coil 113. Since the voltages of the first drive signal and the second drive signal periodically change by the cycle according to the power transfer frequency, the power of the power transfer frequency is transferred from the power transfer coil 113.

The power transfer amplifier SAMP used in the eighth embodiment is an inverter circuit referred to as a full bridge circuit, and is used in the case of the power transfer frequency lower than that of the E class amplifier shown in FIG. 1, for example, in the case of the relatively low power transfer frequency such as about several tens kHz to 100 kHz. Also, the filter 308 is provided for suppressing the harmonic level generated in the inverter circuit, and is composed of, for example, an L-shaped low pass filter.

In FIG. 22, 700 denotes an electric vehicle. Next, a contactless power receiving device 2-5 mounted in the electric vehicle 700 will be described. The contactless power receiving device 2-5 is similar to the contactless power receiving device 2-3 shown in FIG. 16. Namely, the matching circuit 123, the common mode filter 124, the rectifier diodes 125 to 128, the load resistance 134, the communication circuit 431, the antenna 432, the control circuit 433, and the display device 434 shown in FIG. 22 are the same as those shown in FIG. 16. In addition, the smoothing circuit 129 shown in FIG. 22 has the same configuration as that of the smoothing circuit shown in FIG. 15.

In this eighth embodiment, a chopper circuit 723 capable of outputting a large current is used as the switching power supply instead of the DC-DC converter 133. Also, a power receiving coil 722 having no intermediate tap is used instead of the power receiving coil 121, and a capacitance element denoted as 721 is used as a resonant capacitance element connected in parallel to the power receiving coil 722. The chopper circuit 723 has the same characteristics as the DC-DC converter 133. Therefore, as described in the first embodiment, by providing the inductors 130 and 131 in the smoothing circuit 129, the change rate of the operating current Idd with respect to the change in the power supply voltage Vdd of the power transfer amplifier SAMP can be made to differ for each input equivalent resistance of the chopper circuit 723. As a result, it is possible to suppress the chopper circuit 723 from operating in the state of low efficiency. Further, it is possible to make the chopper circuit 723 operate normally. Furthermore, it is possible to suppress the voltage exceeding the breakdown voltage of the rectifier diodes 125 to 128 from being supplied.

In this eighth embodiment, a monitor device that monitors the state of the electric vehicle 700 is mounted in the electric vehicle 700. In FIG. 22, a monitor device that monitors a pneumatic pressure of a tire 700D of the electric vehicle 700 is shown as an example. This monitor device includes a sensor unit provided in a wheel of the tire 700D and a monitoring unit mounted in a body of the electric vehicle 700. The sensor unit includes a power receiving coil 744, a pneumatic pressure sensor 742, a transmission circuit 741, and an antenna 743, and the monitoring unit includes a power transfer coil 734, a receiving circuit 731, and an antenna 732.

The power receiving coil 744 and the power transfer coil 734 are electromagnetically coupled, and power is supplied from the power transfer coil 734 to the power receiving coil 744. The transmission circuit 741 and the pneumatic pressure sensor 742 are operated by the power from the power receiving coil 744. The pneumatic pressure sensor 742 measures the pneumatic pressure of the tire 700D, and information of the measured pneumatic pressure is transmitted wirelessly by the transmission circuit 741 from the antennal 743. The information of the pneumatic pressure transmitted from the antenna 743 is supplied to the receiving circuit 731 through the antenna 732. The receiving circuit 731 forms monitoring information from, for example, the received information of the pneumatic pressure. The pneumatic pressure of the tire 700D is monitored based on the monitoring information.

In this eighth embodiment, since the smoothing circuit 129 includes the inductors 130 and 131, it is possible to prevent the chopper circuit 723 from being in a state of low efficiency or a state of not operating normally. Namely, it is possible prevent the operation of the chopper circuit 723 from being unstable.

Also, since the ripple voltage generated in the contactless power receiving device 2-4 can be reduced, it is possible to reduce the noise radiated from the contactless power receiving device 2-4.

A sensor output from the pneumatic pressure sensor 742 is an analog signal. Therefore, the transmission circuit 741 includes an analog-digital converter circuit (hereinafter, referred to as AD converter) that converts an analog signal to a digital signal, and converts the sensor output that is an analog signal into a digital signal and wirelessly transmits the digital signal. In this case, the AD converter converts an analog signal to a digital signal while comparing a reference voltage and the sensor output. In this eighth embodiment, since it is possible to reduce the noise radiated from the contactless power receiving device 2-4, the change in the reference voltage due to the noise can be suppressed, so that the it is possible to perform the highly accurate measurement.

For example, the contactless power receiving device 2-3 described in the fourth embodiment can be used as the sensor unit, and the contactless power transfer device 1-3 described in the fourth embodiment can be used as the monitoring unit.

In this case, for example, the power receiving coil 121 shown in FIG. 16 is used as the power receiving coil 744 shown in FIG. 22, the antenna 432 is used as the antenna 743, and the communication circuit 431 and the control circuit 433 are used as the transmission circuit 741. The power formed by the DC-DC converter 133 is transferred as the operating power to the pneumatic pressure sensor 742 and the AD converter, and the output of the AD converter is supplied through the control circuit 433 to the communication circuit 431 and is then transmitted wirelessly. In this case, since the ripple voltage can be reduced as shown in FIG. 13, it is possible to reduce the change in reference voltage of the AD converter, so that it is possible to suppress the reduction in the measurement accuracy.

When the contactless power transfer device 1-3 is used as the monitoring unit, the power transfer coil 113 shown in FIG. 16 is used as the power transfer coil 734 shown in FIG. 22, the antenna 422 is used as the antenna 732, and the communication circuit 421 and the control circuit 423 are used as the receiving circuit 731. In this case, for example, the power formed by the chopper circuit 723 is used as the variable voltage power supply 103.

Ninth Embodiment

FIG. 23 is a schematic external view showing a configuration of a contactless power transfer and receiving device according to a ninth embodiment. In FIG. 23, 800 denotes an unmanned drone and 611 denotes a charging stand. In this ninth embodiment, a battery and a contactless power receiving device are mounted in the unmanned drone 800, and a contactless power transfer device is mounted in the charging stand 611. When charging the battery of the unmanned drone 800, the unmanned drone 800 is caused to fly so as to be located above the charging stand 611. In this manner, the battery is charged contactlessly.

Here, the configuration described in the fourth embodiment is adopted as the contactless power transfer and receiving device. Also, since a configuration of the charging stand 611 is the same as the configuration described in the seventh embodiment, the description of the charging stand 611 will be omitted.

The unmanned drone 800 includes four propellers 802 rotated individually by a motor and a body 801 of the unmanned drone 800. The contactless power receiving device 2-3 described in the fourth embodiment is mounted in the body 801. FIG. 23 shows the power receiving coil 121, the antenna 432, the control circuit 433, and the communication circuit 431 provided in the contactless power receiving device 2-3 as an example. The power receiving coil 121 is mounted on a lower surface of the body 801 with a magnetic sheet 615 interposed therebetween. Since FIG. 23 is a diagram in which the body 801 is viewed from above, the magnetic sheet 615 and the power receiving coil 121 are indicated by broken lines.

When charging the battery of the unmanned drone 800, it is conceivable that the DC-DC converter 133 (FIG. 16) operates in the state of low efficiency unless the positions of the power transfer coil 133 and the power receiving coil 121 are appropriate. Since an error is displayed on the display screen 424D in this case, the unmanned drone 800 is operated so that the unmanned drone 800 is located at an appropriate position. Accordingly, it is possible to prevent the state in which the operation of the DC-DC converter 133 becomes unstable when charging the battery.

In the first to ninth embodiments, the contactless power transfer device and the contactless power receiving device have been described by the use of the term "contactless". Although it is desirable that the power transfer coil and the power receiving coil are not in contact with each other, but they may be in contact with each other.

In the foregoing, the invention made by the inventors of the present invention has been concretely described based on the embodiments. However, the present invention is not limited to the foregoing embodiments and various modifications can be made within the scope of the present invention.

REFERENCE SIGNS LIST 1, 1-1 to 1-3: contactless power transfer device
2, 2-1 to 2-5: contactless power receiving device
103: variable voltage power supply
106, 111, 124: common mode filter 113: power transfer coil
121: power receiving coil
123: matching circuit
129: smoothing circuit
130, 131: inductor
132: smoothing capacitance element
133: DC-DC converter
SAMP: power transfer amplifier

The invention claimed is:

1. A contactless power receiving device comprising:
a power receiving coil configured to receive power from a contactless power transfer device;
a rectifier circuit configured to rectify the power received by the power receiving coil to form a rectified output on a high potential side and a rectified output on a low potential side;
a smoothing circuit configured to smooth the rectified output on the high potential side and the rectified output on the low potential side supplied from the rectifier circuit, thereby forming a DC voltage; and
a switching power supply configured to convert the DC voltage from the smoothing circuit to a first voltage,
wherein the smoothing circuit includes a first inductor configured to transmit the rectified output on the high potential side, a second inductor configured to transmit the rectified output on the low potential side, and a first smoothing capacitance element to which the transmitted rectified output on the high potential side and the transmitted rectified output on the low potential side are supplied, and the transmitted rectified output on the low potential side is connected to a ground potential.

2. The contactless power receiving device according to claim 1,
wherein the smoothing circuit includes a second smoothing capacitance element connected between the first inductor to which the rectified output on the high potential side is supplied and the second inductor to which the rectified output on the low potential side is supplied, and
wherein the second smoothing capacitance element has a capacitance value to be an impedance lower than a power receiving impedance of the power receiving coil with respect to harmonics of the power.

3. The contactless power receiving device according to claim 1,
wherein the contactless power transfer device includes a power transfer amplifier configured to generate power and a power transfer coil configured to transfer the power from the power transfer amplifier,
wherein an input equivalent resistance of the switching power supply connected to the smoothing circuit changes by a load connected to the switching power supply, and
wherein values of the first inductor and the second inductor are set so that a change rate of an operating current of the power transfer amplifier with respect to a change in a power supply voltage of the power transfer amplifier differs depending on a value of the input equivalent resistance of the switching power supply.

4. The contactless power receiving device according to claim 1, further comprising a common mode filter connected between the power receiving coil and the rectifier circuit.

5. A contactless power transfer and receiving device comprising the contactless power receiving device according to claim 4,
wherein the contactless power receiving device includes a first modulation demodulation circuit connected to a former stage of the common mode filter, the first modulation demodulation circuit being configured to perform modulation and demodulation to received power,
wherein the contactless power transfer device includes: a power transfer amplifier configured to generate power; a filter configured to suppress a harmonic in the power; a power transfer coil to which the power from the power transfer amplifier is supplied through the filter; a common mode filter connected between the filter and the power transfer coil; and a second modulation demodulation circuit connected to a latter stage of the common mode filter, the second modulation demodulation circuit being configured to perform modulation and demodulation to transferred power, and
wherein the first modulation demodulation circuit is a load modulation circuit configured to perform load modulation to the received power and the second modulation demodulation circuit is an amplitude modulation circuit configured to perform amplitude modulation to the transferred power.

6. The contactless power receiving device according to claim 1,
wherein the switching power supply includes a step-down type DC-DC converter.

7. A contactless power transfer and receiving device comprising the contactless power receiving device according to claim 1,
wherein the contactless power transfer device includes:
a power transfer amplifier configured to generate power;
a filter configured to suppress a harmonic in the power generated by the power transfer amplifier;
a power transfer coil to which the power from the power transfer amplifier is supplied through the filter; and
a common mode filter connected between the filter and the power transfer coil.

8. The contactless power transfer and receiving device according to claim 7,
wherein the power transfer amplifier includes a first field effect transistor and a second field effect transistor, and the first field effect transistor and the second field effect transistor include a switching amplifier driven by a push-pull system.

9. A contactless power receiving device comprising:
a power receiving coil configured to receive power from a contactless power transfer device having a power transfer amplifier;
a rectifier circuit configured to rectify the power received by the power receiving coil;
a matching circuit configured to achieve impedance matching between the power receiving coil and the rectifier circuit;
a smoothing circuit configured to smooth a rectified output from the rectifier circuit to a DC voltage; and
a switching power supply configured to convert the DC voltage from the smoothing circuit to a first voltage,
wherein the power receiving coil is connected to a resonant capacitance element to constitute a resonant circuit, and
wherein the matching circuit includes an input terminal connected to the resonant circuit, an output terminal connected to the rectifier circuit, inductors connected between the input terminal and the output terminal in parallel, and a matching capacitance element connected to the input terminal.

10. The contactless power receiving device according to claim 9,
  wherein an input equivalent resistance of the switching power supply connected to the rectifier circuit changes based on a load connected to the switching power supply, and
  wherein characteristics of the matching circuit are set so that a change rate of an operating current of the power transfer amplifier with respect to a change in a power supply voltage of the power transfer amplifier differs depending on the input equivalent resistance of the switching power supply.

11. The contactless power receiving device according to claim 10,
  wherein a capacitance value of the matching capacitance element in the matching circuit is set so that the change rate of the operating current of the power transfer amplifier increases with respect to decrease in the input equivalent resistance of the switching power supply.

12. The contactless power receiving device according to claim 9,
  wherein the power receiving coil includes a first tap, a second tap, and a third tap disposed between the first tap and the second tap, and
  wherein the resonant capacitance element is connected between the first tap and the second tap, and the input terminal of the matching circuit is connected to the third tap.

13. The contactless power receiving device according to claim 9,
  wherein the matching circuit includes an adjustment circuit connected in parallel to the matching capacitance element, and
  wherein the adjustment circuit includes a field effect transistor and an adjustment capacitance element, and the adjustment capacitance element is selectively connected to the matching capacitance element by the field effect transistor.

\* \* \* \* \*